(12) United States Patent
Chen et al.

(10) Patent No.: US 10,620,984 B2
(45) Date of Patent: Apr. 14, 2020

(54) VIRTUAL MACHINE START METHOD AND APPARATUS

(71) Applicant: Huawei Technologies Co., Ltd., Shenzhen (CN)

(72) Inventors: Lifu Chen, Shenzhen (CN); Dehan Li, Shenzhen (CN); Tizheng Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 424 days.

(21) Appl. No.: 15/443,458

(22) Filed: Feb. 27, 2017

(65) Prior Publication Data

US 2017/0249180 A1    Aug. 31, 2017

(30) Foreign Application Priority Data

Feb. 25, 2016   (CN) ........................ 2016 1 0104045
Jul. 29, 2016   (CN) ........................ 2016 1 0619031

(51) Int. Cl.
*G06F 9/455*   (2018.01)
*H04L 12/24*   (2006.01)
*H04L 12/46*   (2006.01)

(52) U.S. Cl.
CPC ...... *G06F 9/45558* (2013.01); *H04L 12/4641* (2013.01); *H04L 41/0806* (2013.01);
(Continued)

(58) Field of Classification Search
None
See application file for complete search history.

(56) References Cited

U.S. PATENT DOCUMENTS 9,009,217 B1 *   4/2015   Nagargadde ........ G06F 17/5009
                                                    709/203
9,760,428 B1 *   9/2017   Felstaine ............... H04L 41/022
(Continued)

FOREIGN PATENT DOCUMENTS

CN    103294494 A    9/2013
CN    103902310 A    7/2014
(Continued)

OTHER PUBLICATIONS

Machine Translation and Abstract of Chinese Publication No. CN103294494, Sep. 11, 2013, 9 pages.
(Continued)

*Primary Examiner* — Lewis A Bullock, Jr.
*Assistant Examiner* — Bruce S Ashley
(74) *Attorney, Agent, or Firm* — Conley Rose, P.C.

(57) ABSTRACT

A virtual machine start method and apparatus is presented, where the method includes determining N types of virtualized network function components (VNFCs) according to a first service; obtaining a distribution relationship between the N types of VNFCs and virtual machines, where the distribution relationship indicates a quantity of each type of VNFC distributed in each virtual machine; selecting at least one to-be-started virtual machine from unstarted virtual machines according to the distribution relationship, so that a total quantity of each type of VNFC included in a started virtual machine and the at least one to-be-started virtual machine meets a corresponding preset quantity; and starting the at least one to-be-started virtual machine. In the present disclosure, types and a quantity of VNFCs running on each virtual machine are first obtained.

10 Claims, 10 Drawing Sheets

(52) U.S. Cl.
CPC .. *H04L 41/0896* (2013.01); *G06F 2009/4557* (2013.01); *G06F 2009/45575* (2013.01); *G06F 2009/45595* (2013.01); *H04L 41/5041* (2013.01)

(56) References Cited

U.S. PATENT DOCUMENTS

| | | | | |
|---|---|---|---|---|
| 2009/0327781 | A1* | 12/2009 | Tripathi | G06F 9/4818 713/324 |
| 2013/0290541 | A1* | 10/2013 | Hatasaki | G06F 9/5077 709/226 |
| 2014/0237468 | A1* | 8/2014 | Desai | G06F 9/5077 718/1 |
| 2015/0043379 | A1 | 2/2015 | Shimokuni et al. | |
| 2015/0106806 | A1* | 4/2015 | Reddy | G06F 9/45533 718/1 |
| 2015/0222515 | A1 | 8/2015 | Mimura et al. | |
| 2016/0098297 | A1* | 4/2016 | Yuyitung | G06F 11/3442 718/104 |
| 2016/0234082 | A1 | 8/2016 | Xia et al. | |
| 2016/0335111 | A1* | 11/2016 | Bruun | G06F 9/45558 |
| 2018/0316559 | A1* | 11/2018 | Thulasi | H04L 41/082 |

FOREIGN PATENT DOCUMENTS

| | | |
|---|---|---|
| CN | 103970555 A | 8/2014 |
| JP | 2015149578 A | 8/2015 |
| JP | 2015191246 A | 11/2015 |
| JP | 2015194949 A | 11/2015 |
| WO | 2015058626 A1 | 4/2015 |
| WO | 2015126430 A1 | 8/2015 |

OTHER PUBLICATIONS

Machine Translation and Abstract of Chinese Publication No. CN103902310, Jul. 2, 2014, 10 pages.
Machine Translation and Abstract of Chinese Publication No. CN103970555, Aug. 6, 2014, 10 pages.
Nakagawa, Y., et al., Dynamic Virtual Network Configuration between Containers using Physical Switch Functions for NFV Infrastructure, XP032852437, IEEE Conference on Network Function Virtualization and Software Defined Network (NFV-SDN), 2015, pp. 156-162.
Foreign Communication From a Counterpart Application, European Application No. 17157879.2, Extended European Search Report dated Jul. 5, 2017, 9 pages.
Machine Translation and Abstract of Japanese Publication No. JP2015191246, Nov. 2, 2015, 16 pages.
Machine Translation and Abstract of Japanese Publication No. JP2015194949, Nov. 5, 2015, 33 pages.
Foreign Communication From a Counterpart Application, Japanese Application No. 2017-034814, Japanese Notice of Allowance dated Jun. 12, 2018, 3 pages.

\* cited by examiner

VIRTUAL MACHINE START METHOD AND APPARATUS

CROSS-REFERENCE TO RELATED APPLICATION

This application claims priority to Chinese Patent Application No. 201610619031.4, filed on Jul. 29, 2016, which claims priority to Chinese Patent Application No. 201610104045.2, filed on Feb. 25, 2016, which is hereby incorporated by reference in its entirety.

TECHNICAL FIELD

Embodiments of the present disclosure relate to the communications field, and more specifically, to a virtual machine start method and apparatus.

BACKGROUND

For an operator, a data center, a cloud computing service provider, and a large network enterprise, deployment and application of NFV play an increasingly important role. In Network Function Virtualization (NFV), universal hardware such as an x86 processor, and a virtualization technology are used to carry software processing to implement many functions, so as to reduce high device costs in a network. In NFV, by means of software and hardware decoupling and function abstraction, a network device function is no longer dependent on special-purpose hardware, and a resource can be fully and flexibly shared. In this way, rapid development and deployment of a new service are implemented, and automatic deployment, auto scaling, fault isolation, self-healing, and the like are implemented based on an actual service (a network mentioned in this field refers to a network service) requirement.

According to an NFV technical principle, a network service may include at least one Virtualised Network Function (VNF), and each VNF may be decomposed into a group of Virtualised Network Function Components (VNFCs). That is, an NFV network includes one or more VNFs, and a VNF includes one or more VNFCs. The VNFCs are a group of processes or software modules of a software package providing a specified network service function. Correspondingly, from a physical perspective, the VNFCs include an interface board, a software package, a switch board, a service processing board, a main control board, and the like. Correspondingly, from a software perspective, the VNFCs include an interface process, a switch process, a service processing process, a main control process, and the like. VNFCs of a same type can implement a same function, and each VNFC is finally mapped to a virtual machine (VM). Generally, a same type of VNFC may run on multiple virtual machines (so as to provide a stronger service processing capability or higher service reliability), and multiple different virtualized network function components may also run on a same virtual machine. When a virtual machine is started, virtualized network function components running on the virtual machine simultaneously start and run.

Generally, one VNF may have several types of VNFCs, and each type of VNFC implements a different function. In a complete NFV network, there are X0 VNFs of a same type, and correspondingly, there are also X0 VNFCs of each type for this type of VNF. There may be multiple VNFCs of a same type, and only start time of a VNFC or a virtual machine on which a VNFC runs is different. It should be noted that VNFCs are randomly distributed in a virtual machine.

Referring to FIG. 1, FIG. 1 is a schematic distribution diagram of VNFCs in virtual machines. A VNF0 and a VNF1 are used as examples. VNFCs included in the VNF0 are a VNFC000, a VNFC001, and a VNFC002, and VNFCs included in the VNF1 are a VNFC010 and a VNFC011.

In FIG. 1, a VM0 and a VM4 indicate that all VNFCs of a same VNF may run on a same virtual machine and VNFs running on different virtual machines may be different.

In FIG. 1, a VM1 indicates that only some VNFCs of one VNF may run on a virtual machine.

In FIG. 1, a VM2 and a VM5 indicate that some VNFCs of one VNF may run on a virtual machine, and there may be one or more VNFCs of each type.

In FIG. 1, a VM3 indicates that VNFCs of different VNFs may run on a virtual machine.

At least one specified VNFC set needs to work normally, to enable an NFV network to normally provide a service, and the VNFC set generally includes VNFCs of different VNFs. VNFC sets of services of different types or with different priorities may be different.

A large quantity of virtual machines may run on a large NFV network. These virtual machines share physical resources, such as storage, network, and host resources. During starting, these virtual machines need to read data, such as an operating system (OS) and a VNFC process, from a shared storage, and a large quantity of storage input/output (I/O) operations may be generated. If excessive virtual machines are started simultaneously, a virtual machine boot storm is generated, overloads of resources such as shared storage I/O may be caused, and each virtual machine needs a very long time to be started, or is even abnormal, for example reset or hanging. Therefore, a virtual machine management system on the NFV network may limit a quantity of virtual machines starting simultaneously, so as to avoid the overloads of the resources such as the shared storage I/O when the virtual machines are started.

When the virtual machine management system limits the quantity of virtual machines starting simultaneously, a low-reliability problem is caused correspondingly. In the prior art, a virtual machine management system starts virtual machines according to an order of hosts or VNFs (virtual machines deployed on hosts are started one by one or virtual machines of VNFs are started one by one). Because a quantity of virtual machines starting simultaneously is limited and not planned, all virtual machines cannot be quickly started to run all VNFCs required by a specified network service. Because not all VNFCs required by the specified network service run, the network service cannot be normally provided in a start period, and efficiency of providing the network service is low.

SUMMARY

Embodiments of the present disclosure provide a virtual machine start method and apparatus, so as to quickly provide a service and quickly improve a service processing capability during service fault recovery or system initial establishment of virtual machines.

According to a first aspect, an embodiment of the present disclosure provides a virtual machine start method, where the method is applied to a network function virtualization NFV network on which a first network service is deployed, the NFV network is implemented by multiple virtual machines running on a computing device, the first network service is jointly implemented by N types of virtualized network function components VNFCs, and the method includes obtaining a distribution relationship between the N types of VNFCs and the multiple virtual machines, where the distribution relationship indicates a quantity of each of the N types of VNFCs that is in each of the multiple virtual machines; selecting at least one unstarted virtual machine from the multiple virtual machines as a to-be-started virtual machine set according to the distribution relationship, so that a total quantity of each type of VNFC in a first group of virtual machines meets a preset quantity corresponding to each type of VNFC, where a set of the first group of virtual machines includes a started virtual machine set and the to-be-started virtual machine set, a quantity of started virtual machines in the started virtual machine set is greater than or equal to 0, and when the quantity is greater than 0, the started virtual machine belongs to the multiple virtual machines; and starting a virtual machine in the to-be-started virtual machine set.

According to the method, as few virtual machines as possible can be pertinently and selectively selected according to types and a quantity of VNFCs in each virtual machine, and therefore, a first network service on an NFV network can be implemented as quickly as possible.

According to a second aspect, an embodiment of the present disclosure provides a virtual machine start apparatus, where the apparatus is applied to a network function virtualization NFV network on which a first network service is deployed, the NFV network is implemented by multiple virtual machines running on a computing device, the first network service is jointly implemented by N types of virtualized network function components VNFCs, N is a positive integer, and the apparatus includes an obtaining module configured to obtain a distribution relationship between the N types of VNFCs and the multiple virtual machines, where the distribution relationship indicates a quantity of each of the N types of VNFCs that is in each of the multiple virtual machines; a selection module configured to select at least one unstarted virtual machine from the multiple virtual machines as a to-be-started virtual machine set according to the distribution relationship obtained by the obtaining module, so that a total quantity of each type of VNFC in a first group of virtual machines meets a preset quantity corresponding to each type of VNFC, where a set of the first group of virtual machines includes a started virtual machine set and the to-be-started virtual machine set, a quantity of started virtual machines in the started virtual machine set is greater than or equal to 0, and when the quantity is greater than 0, the started virtual machine belongs to the multiple virtual machines; and a start module configured to start a virtual machine that is in the to-be-started virtual machine set that is selected by the selection module.

The apparatus can pertinently and selectively select as few virtual machines as possible according to types and a quantity of VNFCs in each virtual machine, and therefore, a service on an NFV network can be implemented as quickly as possible.

The technical solutions in the first aspect and the second aspect can be applied to a scenario in which a single service type is required, where the scenario in which the single service type is required includes two cases. One case is that only one type of service with a service priority of an service level agreement (SLA) availability level exists on an NFV network, no other service with a different service priority exists on the network, and all virtual machines on the network support a service of a service type with the priority. The other case is that there are multiple services on an NFV network, and virtual machines on the network include VNFCs corresponding to different services, however, a purpose of currently starting virtual machines is only to implement a specified service.

According to the first aspect or the second aspect, in a possible design, the selecting at least one unstarted virtual machine from the multiple virtual machines as a to-be-started virtual machine set according to the distribution relationship includes the following steps.

Step 1: determining a current quantity weight of each type of VNFC in the first group of virtual machines according to $$\alpha_i = \frac{Qi}{\sum_{j=1}^{N} Qj},$$

where $\alpha_i$ is a current quantity weight of an $i^{th}$ type of VNFC, Qi is a current total quantity of the $i^{th}$ type of VNFC in the first group of virtual machines, Qj is a current total quantity of a $j^{th}$ type of VNFC in the first group of virtual machines, the $i^{th}$ type of VNFC and the $j^{th}$ type of VNFC belong to the N types of VNFCs, and value ranges of i and j include positive integers not greater than N;

Step 2: finding, according to the determined current quantity weight of each type of VNFC and a preset quantity weight of each type of VNFC, a $k^{th}$ type of VNFC whose current quantity weight is less than a preset quantity weight to a maximum degree, where the $k^{th}$ type of VNFC is one of the N types of VNFCs;

Step 3: selecting, from the multiple virtual machines, an unstarted virtual machine including the $k^{th}$ type of VNFC, to be added to the to-be-started virtual machine set; and Repeating step 1, step 2, and step 3 in order, until the total quantity of each type of VNFC that is in the N types and that is in the first group of virtual machines meets the preset quantity corresponding to each type of VNFC.

According to the technical solution, a virtual machine on which a most scarce type of VNFC is located can be selectively selected according to types and a quantity of VNFCs in each virtual machine using an algorithm, and maximum efficiency of a VNFC in a currently started virtual machine can be fully implemented on the premise of ensuring quick implementation of the first network service, so that a service capability of the first network service is quickly improved.

According to the first aspect or the second aspect, in a possible design, the selecting, from the multiple virtual machines, an unstarted virtual machine including the $k^{th}$ type of VNFC, to be added to the to-be-started virtual machine set includes any one of the following manners: selecting an unstarted virtual machine including a maximum quantity of the $k^{th}$ type of VNFC, to be added to the to-be-started virtual machine set; or if multiple unstarted virtual machines include a maximum quantity of the $k^{th}$ type of VNFC, selecting an unstarted virtual machine including a maximum quantity of VNFC types of the N types, to be added to the to-be-started virtual machine set, or selecting an unstarted virtual machine including a maximum total quantity of VNFCs used to implement the first network service, to be added to the to-be-started virtual machine set.

According to the technical solution, a preferential selection solution can be provided in a case in which multiple unstarted virtual machines meet a same filtering condition when a system selects a virtual machine.

According to the first aspect or the second aspect, in a possible design, in a process of repeating step 1, step 2, and step 3 in order, a selection order of the at least one unstarted virtual machine is obtained; and the starting a virtual machine in the to-be-started virtual machine set includes starting the at least one unstarted virtual machine according to the selection order.

According to the technical solution, an orchestration order for starting virtual machines is undoubtedly generated in a process of selecting at least one unstarted virtual machine. Compared with the prior art, a start order is no longer simply based on virtual machine numbers, and according to the order, maximum efficiency of a VNFC in a started virtual machine can be implemented.

According to the first aspect or the second aspect, in a possible design, the selecting at least one unstarted virtual machine from the multiple virtual machines as a to-be-started virtual machine set includes determining K types according to the distribution relationship, where the K types are a subset of the N types, and the K types of VNFCs do not exist in the started virtual machine; selecting L unstarted virtual machines from the multiple virtual machines according to a first preset rule, to be added to the to-be-started virtual machine set, where the L unstarted virtual machines include the K types of VNFCs, and L is not greater than K according to the first preset rule; and selecting H unstarted virtual machines from the multiple virtual machines according to a second preset rule, to be added to the to-be-started virtual machine set, where according to the second preset rule, the total quantity of each type of VNFC in the first group of virtual machines meets the preset quantity corresponding to each type of VNFC. The first preset rule may be preferentially selecting an unstarted virtual machine with most types in the K types. For example, K=3, and the types are separately k1, k2, and k3. A virtual machine including all the three types, k1, k2, and k3, of VNFCs is preferentially selected. If there is no virtual machine including all the three types, k1, k2, and k3, of VNFCs, a virtual machine including two types, among k1, k2, and k3, of VNFCs is selected. If there is still no virtual machine including two types, among k1, k2, and k3, of VNFCs, a virtual machine including one type, among k1, k2, and k3, of VNFCs is selected. The second preset rule may be a random order, and only a simple addition principle needs to be followed. Alternatively, the second preset rule may be a quantity-preferred order, that is, a virtual machine including a maximum quantity (only considering a quantity instead of a type) of VNFCs corresponding to the first network service is preferentially selected. Alternatively, the second preset rule may be a type-preferred order, that is, a virtual machine including a maximum quantity of types of VNFCs corresponding to the first network service is preferentially selected. In a specific implementation manner of any one of the foregoing preset rules, if multiple virtual machines have a same priority, a random manner may be used for selection.

According to the technical solution, as few virtual machines as possible are started, so that basic implementation of the first network service can be ensured, and a function of the first network service can at least be recovered or set up when a virtual machine is faulty or a new virtual machine system is established.

According to the first aspect or the second aspect, in a possible design, in a process of selecting the L unstarted virtual machines from the multiple virtual machines according to the first preset rule, a first selection order of the L unstarted virtual machines is obtained; in a process of selecting the H unstarted virtual machines from the multiple virtual machines according to the second preset rule, a second selection order of the H unstarted virtual machines is obtained; and the starting a virtual machine in the to-be-started virtual machine set includes first starting the L unstarted virtual machines according to the first selection order, and then starting the H unstarted virtual machines according to the second selection order.

Virtual machines are orchestrated for starting according to the foregoing selection orders, so that a started virtual machine can include as many and various VNFCs as possible, and a first network service is quickly recovered or set up.

According to the first aspect or the second aspect, in a possible design, an attribute information table of any virtual machine includes a VNFC field, and a quantity of the $i^{th}$ type of VNFC running on the any virtual machine is recorded in the VNFC field; and the obtaining a distribution relationship between the N types of VNFCs and the multiple virtual machines includes obtaining, by reading the VNFC field, the quantity of the $i^{th}$ type of VNFC running on the any virtual machine.

This is a method for obtaining a distribution relationship between VNFCs and virtual machines, according to which a system can learn a VNFC running status in each virtual machine and a distribution status of each type of VNFC in a virtual machine.

According to the first aspect or the second aspect, in a possible design, any virtual machine includes a software package, and a quantity of the $i^{th}$ type of VNFC is recorded in the software package; and the obtaining a distribution relationship between the N types of VNFCs and the multiple virtual machines includes obtaining, by loading the software package, the quantity of the $i^{th}$ type of VNFC included in the any virtual machine.

This is another method for obtaining a distribution relationship between VNFCs and virtual machines, according to which a system can learn a VNFC running status in each virtual machine and a distribution status of each type of VNFC in a virtual machine.

According to the first aspect or the second aspect, in a possible design, after the foregoing at least one to-be-started virtual machine is started, a remaining to-be-started virtual machine that has not been started may be started in a random order. Generally, each time virtual machines are started, on the premise of meeting target VNFC usage, there is a remaining virtual machine, so as to ensure reliability of VNFCs. According to the method, after the target VNFC usage is met, an order limitation may no longer be imposed on a virtual machine to be started later, and therefore, processing power consumption of a system can be reduced.

According to a third aspect, an embodiment of the present disclosure provides a virtual machine start method, where the method is applied to a network function virtualization NFV network on which M network services are deployed, the NFV network is implemented by multiple virtual machines running on a computing device, an $x^{th}$ service is one network service in the M network services, the $x^{th}$ service is jointly implemented by N(x) types of VNFCs, N is a positive integer, a value range of x includes all positive integers not greater than M, M is a natural number greater than 1, and the method includes obtaining a distribution relationship between the N(x) types of VNFCs and the multiple virtual machines, where the distribution relationship indicates a quantity of an $xi^{th}$ type of VNFC distributed in each of the multiple virtual machines, the $xi^{th}$ type is one of the N(x) types corresponding to the $x^{th}$ service, and a value range of i includes all positive integers not greater than N(x); selecting at least one unstarted virtual machine from the multiple virtual machines as a to-be-started virtual machine set according to the distribution relationship, so that a total quantity of each type of VNFC that is in a first group of virtual machines and that is in the M network services meets a preset quantity corresponding to each type of VNFC, where a set of the first group of virtual machines includes a started virtual machine set and the to-be-started virtual machine set, a quantity of started virtual machines in the started virtual machine set is greater than or equal to 0, and when the quantity is greater than 0, the started virtual machine belongs to the multiple virtual machines; and starting a virtual machine in the to-be-started virtual machine set.

According to the method, as few virtual machines as possible can be pertinently and selectively selected according to types and a quantity of VNFCs in each virtual machine, and therefore, the M network services can be implemented as quickly as possible.

According to a fourth aspect, an embodiment of the present disclosure provides a virtual machine start apparatus, where the apparatus is applied to a network function virtualization NFV network on which M network services are deployed, the NFV network is implemented by multiple virtual machines running on a computing device, an $x^{th}$ service is one network service in the M network services, the $x^{th}$ service is jointly implemented by N(x) types of VNFCs, N is a positive integer, a value range of x includes all positive integers not greater than M, M is a natural number greater than 1, and the apparatus includes an obtaining module configured to obtain a distribution relationship between the N(x) types of VNFCs and the multiple virtual machines, where the distribution relationship indicates a quantity of an $xi^{th}$ type of VNFC distributed in each of the multiple virtual machines, the $xi^{th}$ type is one of the N(x) types corresponding to the $x^{th}$ service, a value range of i includes all positive integers not greater than N(x); a selection module configured to select at least one unstarted virtual machine from the multiple virtual machines as a to-be-started virtual machine set according to the distribution relationship obtained by the obtaining module, so that a total quantity of each type of VNFC that is in a first group of virtual machines and that is in the M network services meets a preset quantity corresponding to each type of VNFC, where a set of the first group of virtual machines includes a started virtual machine set and the to-be-started virtual machine set, a quantity of started virtual machines in the started virtual machine set is greater than or equal to 0, and when the quantity is greater than 0, the started virtual machine belongs to the multiple virtual machines; and a start module configured to start a virtual machine that is in the to-be-started virtual machine set that is selected by the selection module.

The apparatus can pertinently and selectively select as few virtual machines as possible according to types and a quantity of VNFCs in each virtual machine, and therefore, a service on an NFV network can be implemented as quickly as possible.

According to the third aspect or the fourth aspect, in a possible design, the selecting at least one unstarted virtual machine from the multiple virtual machines as a to-be-started virtual machine set according to the distribution relationship includes the following steps.

Step 1: determining a current quantity weight of the $xi^{th}$ type of VNFC in the first group of virtual machines according to $$\alpha_{xi} = \frac{Qxi}{\sum_{j=1}^{N} Qxj},$$

where $\alpha_{xi}$ is the current quantity weight of the $xi^{th}$ type of VNFC, Qxi is a current total quantity of the $xi^{th}$ type of VNFC in the first group of virtual machines, Qxj is a current total quantity of an $xj^{th}$ type of VNFC in the first group of virtual machines, the $xj^{th}$ type is one of the N(x) types corresponding to the $x^{th}$ service, and a value range of j includes all positive integers not greater than N(x);

Step 2: finding, according to the determined current quantity weight $\alpha_{xi}$ of the $xi^{th}$ type of VNFC and a preset quantity weight of the $xi^{th}$ type of VNFC, a $k^{th}$ type of VNFC whose current quantity weight is less than a preset quantity weight to a maximum degree, where the $k^{th}$ type of VNFC is one of the N(x) types of VNFCs;

Step 3: selecting, from the multiple virtual machines, an unstarted virtual machine including the $k^{th}$ type of VNFC, to be added to the to-be-started virtual machine set; and Repeating step 1, step 2, and step 3 in order, until the total quantity of each type of VNFC that is included in the first group of virtual machines and that is in the M network services meets the preset quantity corresponding to each type of VNFC.

According to the technical solution, a virtual machine on which a most scarce type of VNFC is located can be selectively selected according to types and a quantity of VNFCs in each virtual machine using an algorithm, and maximum efficiency of a VNFC in a currently started virtual machine can be fully implemented on the premise of ensuring quick implementation of the M services.

According to the third aspect or the fourth aspect, in a possible design, the selecting at least one unstarted virtual machine from the multiple virtual machines as a to-be-started virtual machine set according to the distribution relationship includes determining a descending order of priorities of the M services, and successively performing a service enabling operation on all services in the M services according to the descending order of priorities, where the service enabling operation includes the following steps.

Step 1: determining a current quantity weight of each type of VNFC in the first group of virtual machines according to $\alpha$, where $\alpha_{xi}$ is a current quantity weight of the $xi^{th}$ type of VNFC, Qxi is a current total quantity of the $xi^{th}$ type of VNFC in the first group of virtual machines, Qxj is a current total quantity of the $xj^{th}$ type of VNFC in the first group of virtual machines, and a value range of xj includes all positive integers not greater than N(x) corresponding to the current service.

Step 2: finding, according to the determined current quantity weight $\alpha_{xi}$ of each type of VNFC in the current service and a preset quantity weight of each type of VNFC in the current service, a $k^{th}$ type of VNFC whose current quantity weight is less than a preset quantity weight to a maximum degree, where the $k^{th}$ type is one of the N(x) types in the current service.

Step 3: selecting, from the multiple virtual machines, an unstarted virtual machine including the $k^{th}$ type of VNFC, to be added to the to-be-started virtual machine set.

Repeating step 1, step 2, and step 3 in order, until a total quantity of each type of VNFC that is in the first group of virtual machines and that is in the current service meets a preset quantity corresponding to each type of VNFC in the current service.

According to the technical solution, a virtual machine on which a most scarce type of VNFC is located can be selectively selected according to types and a quantity of VNFCs in each virtual machine using an algorithm, and maximum efficiency of a VNFC in a currently started virtual machine can be fully implemented on the premise of ensuring quick implementation of the M services. In addition, service priorities are differentiated. Therefore, it can be ensured that maximum efficiency of a VNFC in a high-priority service is preferentially implemented, then a VNFC in a low-priority service is considered, and especially, quick recovery of the high-priority service is ensured.

According to the third aspect or the fourth aspect, in a possible design, the selecting, from the multiple virtual machines, an unstarted virtual machine including the $k^{th}$ type of VNFC, to be added to the to-be-started virtual machine set includes any one of the following manners: selecting an unstarted virtual machine including a maximum quantity of the $k^{th}$ type of VNFC, to be added to the to-be-started virtual machine set; or if multiple unstarted virtual machines include a maximum quantity of the $k^{th}$ type of VNFC, selecting an unstarted virtual machine including a maximum quantity of VNFC types, to be added to the to-be-started virtual machine set, or selecting an unstarted virtual machine including a maximum quantity of VNFCs, to be added to the to-be-started virtual machine set.

According to the technical solution, a preferential selection solution is provided in a case in which multiple unstarted virtual machines meet a same filtering condition when a system selects at least one unstarted virtual machine.

According to the third aspect or the fourth aspect, in a possible design, in a process of repeating step 1, step 2, and step 3, a selection order of the at least one selected unstarted virtual machine is obtained; and the starting a virtual machine in the to-be-started virtual machine set includes starting the at least one selected unstarted virtual machine according to the selection order.

An orchestration order for starting virtual machines is undoubtedly generated in a process of selecting at least one unstarted virtual machine. Compared with the prior art, a start order is no longer simply based on virtual machine numbers, and according to the order, maximum efficiency of a VNFC in a started virtual machine can be implemented.

According to the third aspect or the fourth aspect, in a possible design, in a process of successively performing the service enabling operation on all services in the M services according to the descending order of priorities, a selection order of the at least one selected unstarted virtual machine is obtained; and the starting a virtual machine in the to-be-started virtual machine set includes starting the at least one selected unstarted virtual machine according to the selection order.

An orchestration order for starting virtual machines is undoubtedly generated in a process of selecting at least one unstarted virtual machine. Compared with the prior art, a start order is no longer simply based on virtual machine numbers, and according to the order, maximum efficiency of a VNFC in a started virtual machine can be implemented.

According to the third aspect or the fourth aspect, in a possible design, the selecting at least one unstarted virtual machine from the multiple virtual machines as a to-be-started virtual machine set includes determining K types according to the distribution relationship, where the K types are a subset of all VNFC types corresponding to the M services, and the K types of VNFCs do not exist in the started virtual machine; selecting L unstarted virtual machines from the multiple virtual machines according to a first preset rule, to be added to the to-be-started virtual machine set, where the L unstarted virtual machines include the K types of VNFCs, and L is not greater than K according to the first preset rule; and selecting H unstarted virtual machines from the multiple virtual machines according to a second preset rule, to be added to the to-be-started virtual machine set, where according to the second preset rule, the total quantity of each type of VNFC that is included in the first group of virtual machines and that is in the M network services meets the preset quantity corresponding to each type of VNFC. For example, K=3, and the types are separately k1, k2, and k3. A virtual machine including all the three types, k1, k2, and k3, of VNFCs is preferentially selected. If there is no virtual machine including all the three types, k1, k2, and k3, of VNFCs, a virtual machine including two types, among k1, k2, and k3, of VNFCs is selected. If there is still no virtual machine including two types, among k1, k2, and k3, of VNFCs, a virtual machine including one type, among k1, k2, and k3, of VNFCs is selected. The second preset rule may be a random order, and only a simple addition principle needs to be followed. Alternatively, the second preset rule may be a quantity-preferred order, that is, a virtual machine including a maximum quantity (only considering a quantity instead of a type) of VNFCs corresponding to a corresponding service is preferentially selected. Alternatively, the second preset rule may be a type-preferred order, that is, a virtual machine including a maximum quantity of types of VNFCs corresponding to a first service is preferentially selected. In a specific implementation manner of any one of the foregoing preset rules, if multiple virtual machines have a same priority, a random manner may be used for selection.

According to a new orchestration method for starting virtual machines provided in the technical solution, as few virtual machines as possible are started, so that basic implementation of a service can be ensured, and a function of the M services can be recovered or set up when a virtual machine is faulty or a new virtual machine system is established.

According to the third aspect or the fourth aspect, in a possible design, in a process of selecting the L unstarted virtual machines from the multiple virtual machines according to the first preset rule, a first selection order of the L to-be-started virtual machines is obtained; in a process of selecting the H unstarted virtual machines from the multiple virtual machines according to the second preset rule, a second selection order of the H to-be-started virtual machines is obtained; and the starting a virtual machine in the to-be-started virtual machine set includes first starting the L unstarted virtual machines according to the first selection order, and then starting the H unstarted virtual machines according to the second selection order.

According to a new orchestration method for starting virtual machines provided in the technical solution, as few virtual machines as possible are started, so that basic implementation of a service can be ensured, and a function of the M services can be recovered or set up when a virtual machine is faulty or a new virtual machine system is established.

According to the third aspect or the fourth aspect, in a possible design, the selecting at least one unstarted virtual machine from the multiple virtual machines as a to-be-started virtual machine set includes determining a descending order of priorities of the M services, successively performing a service assurance operation on all services in the M services according to the descending order of priorities, and selecting H1 unstarted virtual machines from the multiple virtual machines, to be added to the to-be-started virtual machine set; and after the performing a service assurance operation on all services in the M services, selecting H2 unstarted virtual machines from the multiple virtual machines according to a fourth preset rule, to be added to the to-be-started virtual machine set, where according to the fourth preset rule, the total quantity of each type of VNFC that is included in the first group of virtual machines and that is in the M network services meets the preset quantity corresponding to each type of VNFC; where the service assurance operation includes determining K(x) types according to the distribution relationship, where the K(x) types are a subset of the N(x) types in the current service, and the K(x) types of VNFCs do not exist in the started virtual machine; and selecting L(x) unstarted virtual machines from the multiple virtual machines according to a third preset rule, to be added to the to-be-started virtual machine set, where the L(x) unstarted virtual machines include the K(x) types of VNFCs, and L(x) is not greater than K(x) according to the third preset rule.

The technical solution provides a virtual machine orchestration selection method. According to this orchestration order, as few virtual machines as possible are started, and basic implementation of a service can be ensured. Especially when multiple services exist, it can be ensured that a high-priority service is preferentially implemented. Therefore, a service function can at least be recovered or set up when a virtual machine is faulty or a new virtual machine system is established.

According to the third aspect or the fourth aspect, in a possible design, in a process of performing a service assurance operation on all services in the M services, a third selection order of the H1 unstarted virtual machines is obtained; in a process of selecting H2 unstarted virtual machines from the multiple virtual machines according to a fourth preset rule, a fourth selection order of the H2 unstarted virtual machines is obtained; and the starting a virtual machine in the to-be-started virtual machine set includes first starting the H1 unstarted virtual machines according to the third selection order, and then starting the H2 unstarted virtual machines according to the fourth selection order.

According to the technical solution, as few virtual machines as possible are started, and basic implementation of a service can be ensured. Especially when multiple services exist, it can be ensured that a high-priority service is preferentially implemented. Therefore, a service function can at least be recovered or set up when a virtual machine is faulty or a new virtual machine system is established.

According to the third aspect or the fourth aspect, in a possible design, an attribute information table of any virtual machine includes a VNFC field, and a quantity of the $xi^{th}$ type of VNFC running on the any virtual machine is recorded in the VNFC field; and the obtaining a distribution relationship between the N(x) types of VNFCs and the virtual machines includes obtaining, by reading the VNFC field, the quantity of the $xi^{th}$ type of VNFC running on the any virtual machine.

This is a method for obtaining a distribution relationship between VNFCs and virtual machines, according to which a system can learn a VNFC running status in each virtual machine and a distribution status of each type of VNFC in a virtual machine.

According to the third aspect or the fourth aspect, in a possible design, any virtual machine includes a software package, and a quantity of the $xi^{th}$ type of VNFC is recorded in the software package; and the obtaining a distribution relationship between the N(x) types of VNFCs and the virtual machines includes obtaining, by loading the software package, the quantity of the $xi^{th}$ type of VNFC included in the any virtual machine.

This is another method for obtaining a distribution relationship between VNFCs and virtual machines, according to which a system can learn a VNFC running status in each virtual machine and a distribution status of each type of VNFC in a virtual machine.

According to the third aspect or the fourth aspect, in a possible design, after the at least one to-be-started virtual machine is started, a remaining to-be-started virtual machine that has not been started may be started in a random order; and after target VNFC usage is met, an order limitation may no longer be imposed on a virtual machine to be started later.

Generally, each time virtual machines are started, on the premise of meeting the target VNFC usage, there is a remaining virtual machine, so as to ensure reliability of VNFCs. If there is no order limitation, processing power consumption of a system can be reduced.

According to a fifth aspect, the present disclosure provides a virtual machine start device, where the device includes at least a processor, a memory, and a bus, the processor and the memory are connected for communication using the bus, the memory stores a program and an instruction, and the processor invokes the program and the instruction in the memory and is configured to implement any one of the foregoing design methods or equivalent methods.

In the prior art, to avoid a virtual machine boot storm, a quantity of virtual machines that are started simultaneously needs to be limited. Therefore, when there is a constraint on a starting quantity, the virtual machines are generally started according to a host order or a VNF order. In this case, not all of multiple types of VNFCs required to implement a specified service (a target service) can be started quickly, and relatively low service start efficiency is caused. However, in the embodiments of the present disclosure, distribution of types and a quantity of VNFCs in virtual machines is obtained, a to-be-started virtual machine can be selected according to a service requirement, and an order is determined for to-be-started virtual machines. According to the method, it can be ensured that a virtual machine used to run a type of VNFC corresponding to a specified service or a high-priority service is preferentially started, instead of randomly starting virtual machines in batches in the prior art, so that a service is quickly provided and a service processing capability is quickly improved.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
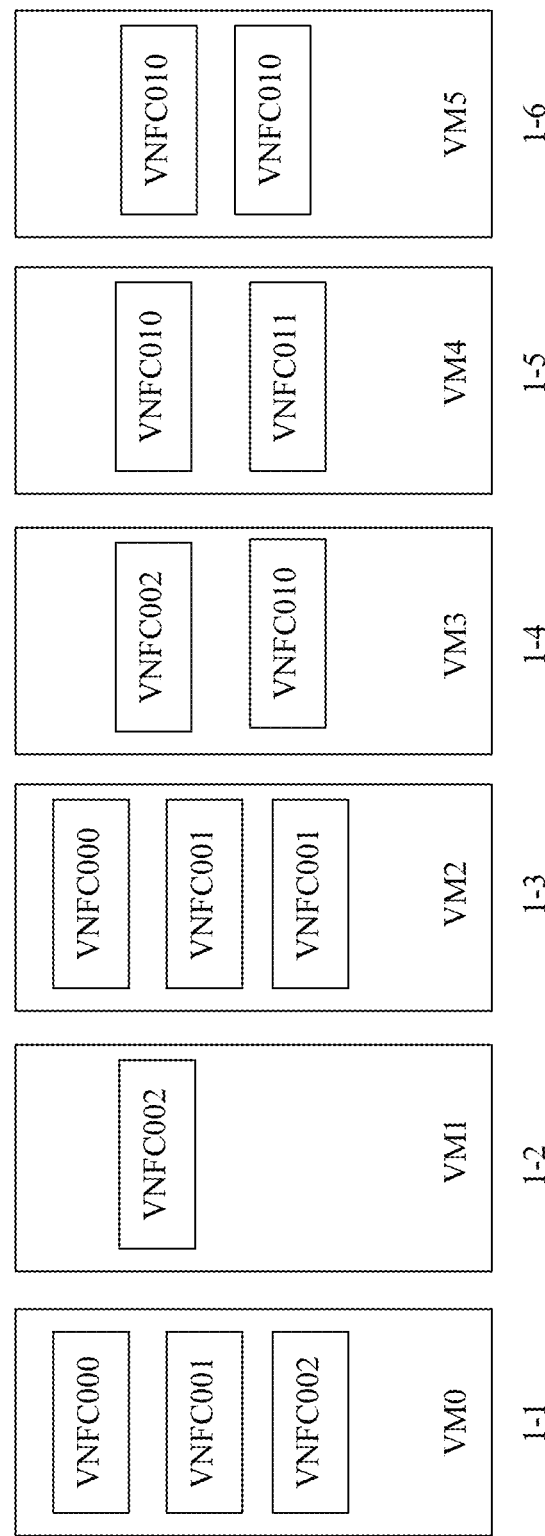
FIG. 1 is a schematic distribution diagram of VNFCs in virtual machines.
Figure 2A:
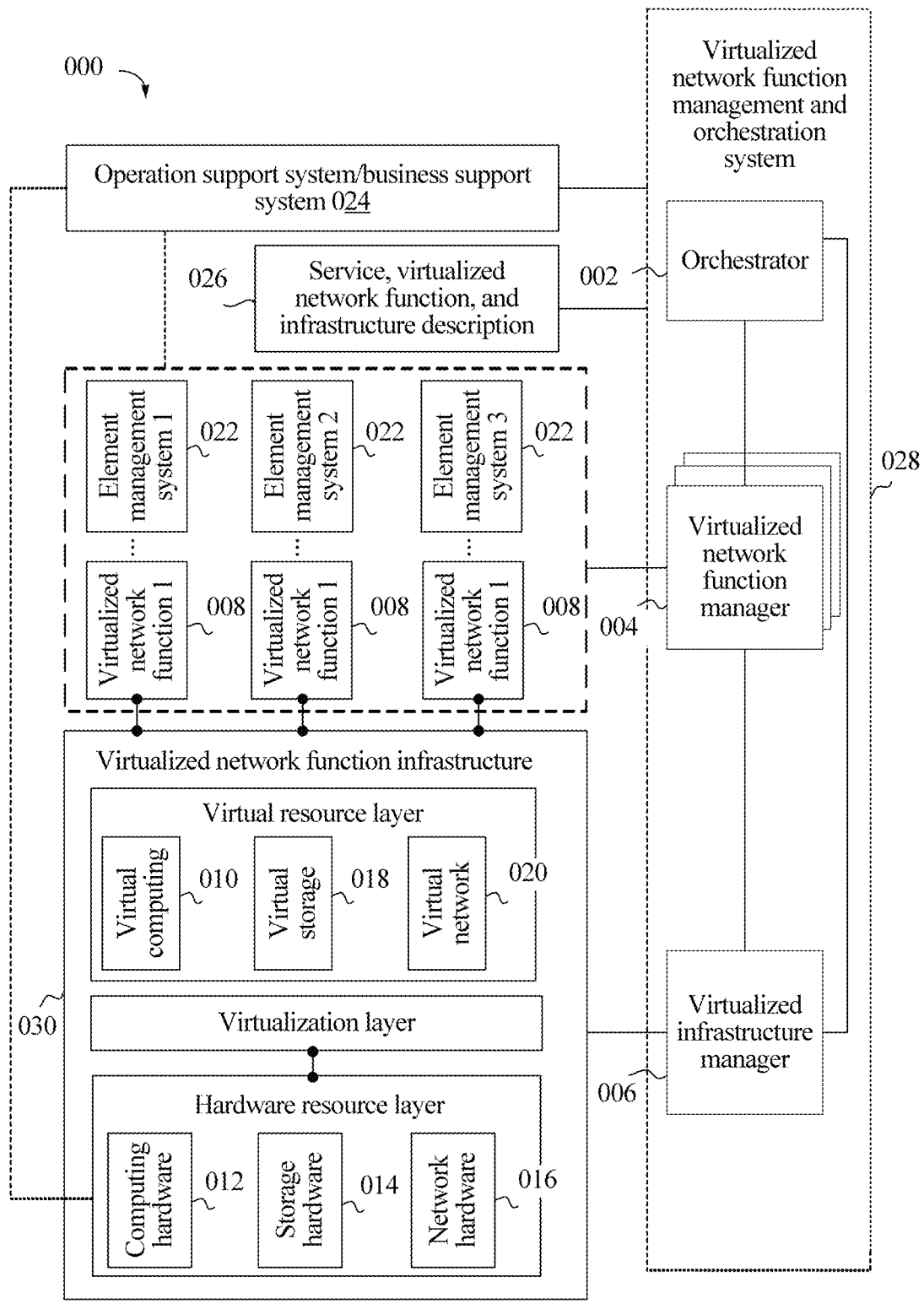
FIG. 2A is a schematic diagram of a system architecture of an NFV system that can be applied according to an embodiment of the present disclosure.

Referring to FIG. 2A, FIG. 2A is a schematic diagram of a system architecture of an NFV system 000 that can be applied according to an embodiment of the present disclosure. It should be noted that the NFV system is merely used as an example for description, and an application scope of the present disclosure is not limited thereto. The NFV system shown in FIG. 2A may be implemented using multiple networks, for example, a data center network, a service provider network, or a local area network (LAN). As shown in FIG. 2A, the NFV system may include an NFV management and orchestration system 028, an NFV infrastructure (NFVI) 030, multiple virtualized network functions (VNF) 008, multiple element management systems (EMS) 022, a service, VNF, and infrastructure description system 026, and one or more operation support systems/ business support systems (OSS/BSS) 024.

The NFV management and orchestration system 028 may include an orchestrator 002, one or more VNF managers 004, and one or more virtualized infrastructure managers 006. The NFVI 030 may include a hardware resource layer including computing hardware 012, storage hardware 014, and network hardware 016, a virtualization layer, and a virtual resource layer including virtual computing 010 (for example, a virtual machine), a virtual storage 018, and a virtual network 020. The computing hardware 012 may be a special-purpose processor or a general-purpose processor configured to provide processing and computing functions. The storage hardware 014 is configured to provide a storage capability. The storage capability may be provided by the storage hardware 014 (for example, a local memory of a server) or may be provided using a network (for example, a server is connected to a network storage device using a network). The network hardware 016 may be a switch, a router, and/or another network device. The network hardware 016 is configured to implement communication between multiple devices. The multiple devices are connected in a wired or wireless manner. The virtualization layer in the NFVI 030 is configured to abstract a hardware resource at the hardware resource layer, decouple the VNFs 008 and a physical layer to which the hardware resource belongs, and provide virtual resources to the VNFs 008. As shown in FIG. 2A, the virtual resource layer may include the virtual computing 010, the virtual storage 018, and the virtual network 020. The virtual computing 010 and the virtual storage 018 may be provided to the VNFs 008 in a virtual machine form or a virtual container in another form. For example, one or more VNFs 008 may be deployed on one virtual machine. The virtualization layer abstracts the network hardware 016 to form the virtual network 020. The virtual network 020, for example, a virtual switches (for example, Vswitches), is used to implement communication between multiple virtual machines or between multiple virtual containers that are of other types and that carry VNFs. Virtualization of the network hardware may be implemented using a technology, such as, a virtual LAN (VLAN), a virtual private local area network service (VPLS), a virtual extensible local area network (VxLAN), or Network Virtualization using Generic Routing Encapsulation (NVGRE). The OSS/BSS 024 is mainly oriented to a telecommunications service operator and provides comprehensive network management and business operation functions, including network management (such as fault monitoring and network information collection), charging management, customer service management, and the like. The service, VNF, and infrastructure description system 026 is described in detail in the European Telecommunications Standards Institute (ETSI) Group Specification (GS) NFV 002 v1.1.1 standard. Therefore, details are not described in this embodiment of the present disclosure.

The NFV management and orchestration system 028 may be configured to monitor and manage the VNFs 008 and the NFVI 030. The orchestrator 002 may communicate with one or more VNF managers 004 to implement a resource-related request, send configuration information to the VNF manager 004, and collect status information of the VNFs 008. In addition, the orchestrator 002 may further communicate with the virtualized infrastructure manager 006 to implement resource allocation, and/or implement reservation and exchange of configuration information and status information of a virtualized hardware resource. The VNF manager 004 may be configured to manage one or more VNFs 008, and perform various management functions, such as, initialization, update, query, and/or stop of the VNFs 008. The virtualized infrastructure manager 006 may be configured to control and manage interaction between the VNFs 008 and the computing hardware 012, the storage hardware 014, the network hardware 016, the virtual computing 010, the virtual storage 018, or the virtual network 020. For example, the virtualized infrastructure manager 006 may be configured to perform an operation for allocating a resource to the VNFs 008. The VNF manager 004 and the virtualized infrastructure manager 006 may communicate with each other to exchange configuration information and status information of the virtualized hardware resource.

The NFVI 030 includes hardware and software. Both of the hardware and the software jointly establish a virtualization environment to deploy, manage, and execute the VNFs 008. In other words, the hardware resource layer and the virtual resource layer are configured to provide virtual resources to the VNFs 008, for example, a virtual machine and/or a virtual container in another form.

As shown in FIG. 2A, the VNF manager 004 may communicate with the VNFs 008 and the EMSes 022 to perform VNF life cycle management and exchange configuration information/status information. A VNF 008 is virtualization of at least one network function, and the network function is previously provided by a physical network device. In an implementation manner, the VNF 008 may be a virtualized mobility management entity (MME) node and is configured to provide all network functions provided by a typical non-virtualized MME device. In another implementation manner, the VNF 008 may be configured to implement functions of some of all components provided by a non-virtualized MME device. One or more VNFs 008 may be deployed on one virtual machine (or one virtual container in another form). The EMSes 022 may be configured to manage one or more VNFs.

An MME is a key control node on a 3rd Generation Partnership Project (3GPP) protocol Long Term Evolution (LTE) access network. The MME is responsible for positioning, paging, and relaying user equipment (UE) in an idle mode. Briefly, the MME is responsible for signaling processing. When UE is initialized and connected to the MME, the MME is responsible for selecting an serving gateway (SGW) for the UE. The MME is further configured to authenticate a user by interacting with a home subscriber server (HSS), and allocate a temporary identifier (ID) to the user. The MME also supports interception and listening in a scope allowed by law.

The present disclosure relates to orchestration and management on a virtualized network function. Therefore, the method and the apparatus involved in the present disclosure are mainly corresponding to the virtualized network function management and orchestration system 028.

Figure 2B:
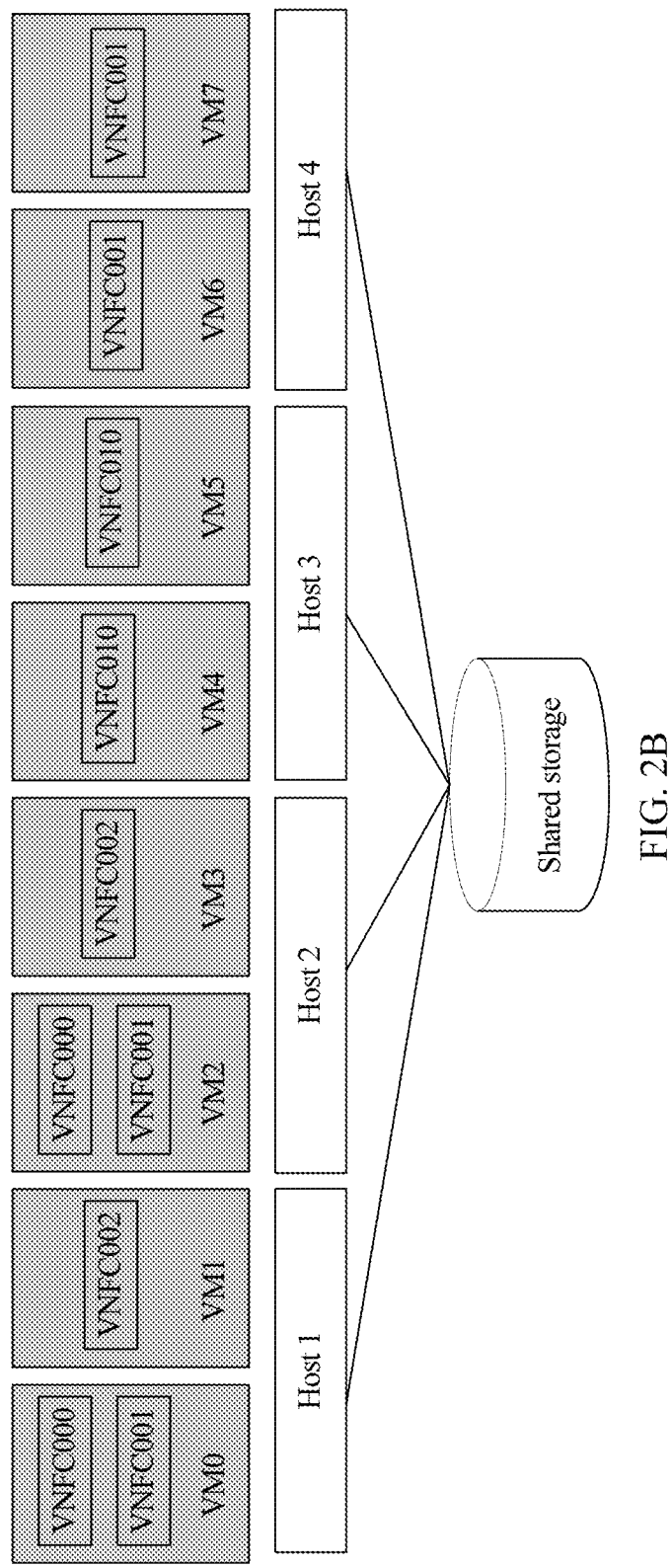
FIG. 2B is a schematic diagram of sharing a physical resource by virtual machines.

In the present disclosure, a VNFC distribution status on an NFV network needs to be concerned first. A large quantity of virtual machines run on a large NFV network. These virtual machines may share some physical resources. The physical resources include a host, a shared storage, and the like. For example, as shown in FIG. 2B, a VM0 and a VM1 share a host 1; a VM2 and a VM3 share a host 2; a VM4 and a VM5 share a host 3; a VM6 and a VM7 share a host 4; and the VM0, the VM1, the VM2, the VM3, the VM4, the VM5, the VM6, and the VM7 share a storage resource. VNFC components run on the virtual machines. Generally, same VNFCs run on multiple virtual machines to provide a stronger service processing capability or higher service reliability. Some virtual machines also run multiple different virtualized network function components. As shown in FIG. 2B, a VNFC000 and a VNFC001 run on both the VM0 and the VM2; a VNFC002 runs on both the VM1 and the VM3; a VNFC010 runs on both the VM4 and the VM5; and a VNFC001 runs on both the VM6 and the VM7.

Figure 3:
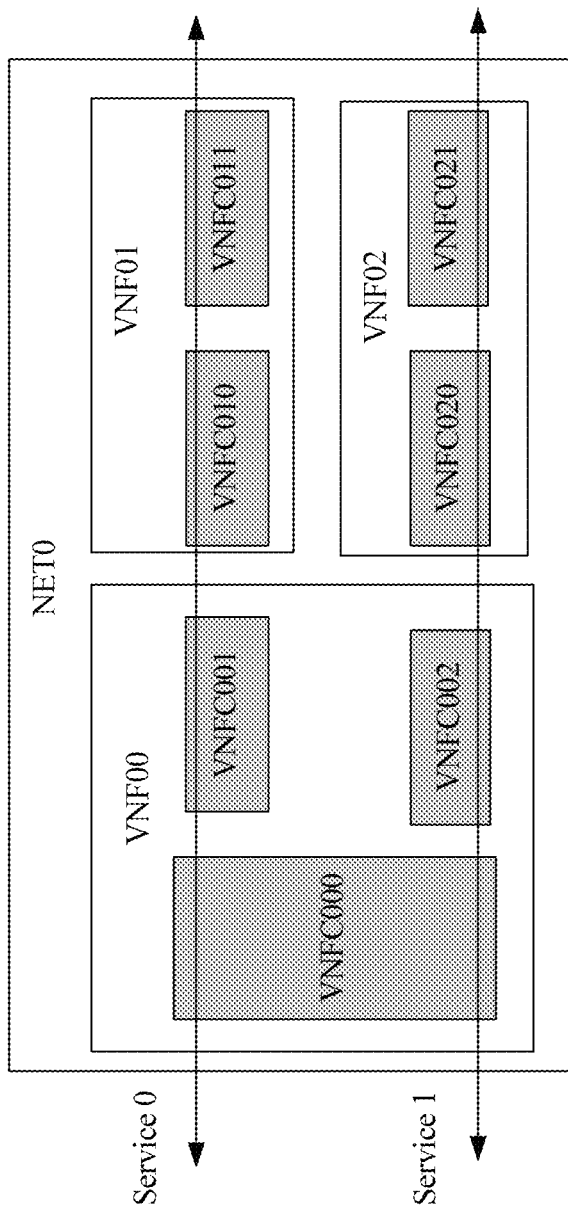
FIG. 3 is a schematic diagram of a correspondence between services and VNFCs on an NFV network.

In actual application, the NFV network needs to normally provide one or more network services, and each network service is corresponding to a specified VNFC set. Therefore, the foregoing NFV network requires that one or more specified VNFC sets work normally. Generally, VNFC sets in different types of services are different. For example, as shown in FIG. 3, a service 0 needs to be jointly implemented by VNFCs in a set {VNFC000, VNFC001, VNFC010, VNFC011}, and a service 1 needs to be jointly implemented by VNFCs in a set {VNFC000, VNFC002, VNFC020, VNFC021}. The VNFC000, the VNFC001, and the VNFC002 belong to a VNF00, the VNFC010 and the VNFC011 belong to a VNF01, and the VNFC020 and the VNFC021 belong to a VNF02. It should be noted that generally, different VNFs are not corresponding to a same VNFC.

In a specific implementation process, a large NFV network can provide many network services, such as, a voice service, and a Rich Communication Suite (RCS) (a short message service message and picture sharing) service. For any specified service, the NFV network needs a specified VNFC set. The set includes at least one type of VNFC, and VNFC types in the VNFC set are different from each other. All VNFCs in the set combine jointly to implement the specified network service, and none is dispensable.

In the prior art, to avoid a virtual machine boot storm, a quantity of virtual machines that are started simultaneously needs to be limited. Therefore, when there is a constraint on a starting quantity of virtual machines, the virtual machines are generally started according to a host order or a VNF order. In this case, not all of multiple types of VNFCs required to implement a specified service (a target service) can be started quickly. Therefore, relatively low service start efficiency is caused. This problem needs to be resolved, especially in a process of starting the virtual machines in a centralized manner or in a scenario in which a large quantity of faulty virtual machines need to be recovered. Therefore, to resolve the problem, this specification provides a virtual machine start method and apparatus, in which a virtual machine start order can be determined and planned in a proper manner according to VNFCs distribution in virtual machines, so that a target service can be restored as soon as possible. Satisfying a target service requirement mainly includes the following two aspects.

(1) A target service can be implemented as quickly as possible, and all VNFCs providing the target service can be started. For example, if the target service is the service 0, all of the four VNFCs, a VNFC000, a VNFC001, a VNFC010, and a VNFC011, need to be started to implement or restore a function of the service 0.

(2) A quantity of each type of VNFC in the target service reaches a preset quantity as quickly as possible, to satisfy a quantity requirement for the target service. For example, if the target service is the service 1 (VNFCs corresponding to the service 1 include a VNFC000, a VNFC002, a VNFC020, and a VNFC021), a service provider obtains, by means of statistics collection of a large quantity of user usage habits, estimated running quantities of VNFCs 000, VNFCs 002, VNFCs 020, and VNFCs 021, and generally, an estimated quantity of each type of VNFC is different. A user may use the VNFC000 in most of time and use the VNFC002 in only a small part of time. It is assumed that quantities of VNFCs 000, VNFCs 002, VNFCs 020, and VNFCs 021 expected by the service provider are respectively 100, 30, 20, and 10. In this case, the service provider needs to start some virtual machines as quickly as possible, so that the quantities of VNFCs 000, VNFCs 002, VNFCs 020, and VNFCs 021 finally running on the started virtual machines respectively reach 100, 30, 20, and 10. In a process that not all VNFCs are started, the service provider expects that a ratio of the quantities of the VNFCs 000, the VNFCs 002, the VNFCs 020, and the VNFCs 021 can approach to 100:30:20:10, so as to fully use limited quantities of VNFCs 000, VNFCs 002, VNFCs 020, and VNFCs 021 in the currently started virtual machines.

Application scenarios of the present disclosure may relate to a single-service type and a multi-service type according to different requirements, and therefore, the following mainly describes the two scenarios separately.

1. Single-Service Scenario

A scenario in which a single-service type is required includes two cases. One case is that there is only one type of service with a service priority of an SLA availability level on an NFV network, there is no other services with different service priorities on the network, and all virtual machines on the network support this type of service with the priority. The other case is that there are multiple services on an NFV network, and virtual machines on the network include VNFCs corresponding to different services, however, a purpose of currently starting virtual machines is only to implement a specified service.

Figure 4:
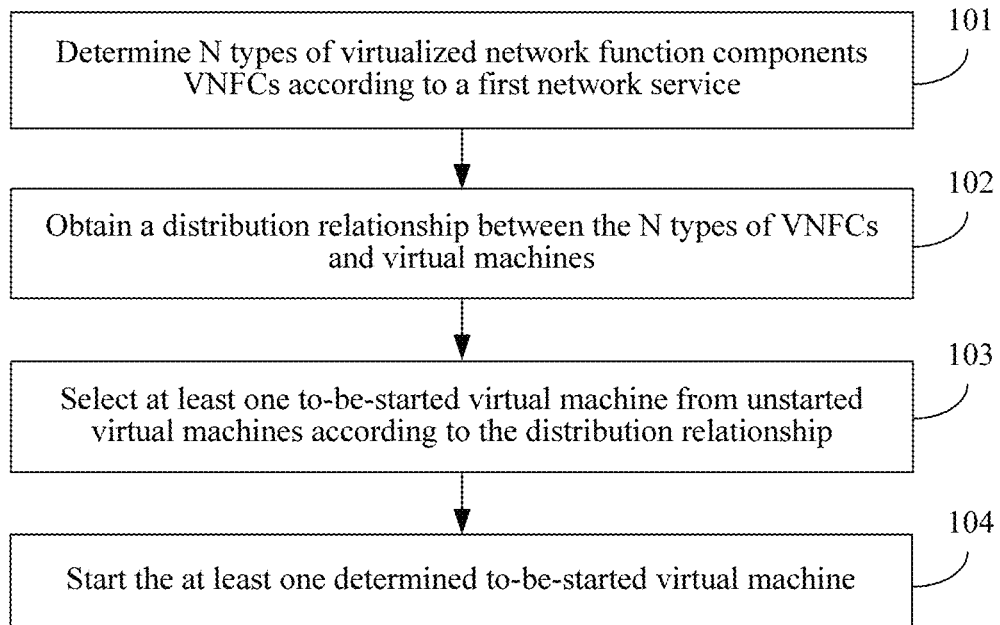
FIG. 4 is a schematic flowchart of a virtual machine start method according to an embodiment of the present disclosure.

Referring to FIG. 4, FIG. 4 is a schematic flowchart of a virtual machine start method according to an embodiment of the present disclosure. The method 100 includes the following steps.

Step 101: Determine N types of virtualized network function components VNFCs according to a first network service, where the first network service is any network service in many network services that can be implemented by virtual machines, such as, voice or multimedia transmission, the N types of VNFCs form a first VNFC set, and N is a positive integer.

Step 102: Obtain a distribution relationship between the N types of VNFCs and the virtual machines, where the distribution relationship indicates a quantity of an $i^{th}$ type of VNFC distributed in each virtual machine in a target searching range, each virtual machine includes a started virtual machine or an unstarted virtual machine, the $i^{th}$ type is one of the foregoing N types, and a value range of i includes all positive integers not greater than N.

The unstarted virtual machine is a virtual machine that has not been powered on for running, and may include a virtual machine that is automatically detected by a system and that needs to be restarted due to a fault, or may include a virtual machine that needs to be started in a system initialization phase. The started virtual machine may include a virtual machine that already completes a start operation and a virtual machine that has run and worked before performing a start operation. It should be noted that a to-be-started virtual machine mentioned in this application document refers to a virtual machine that has been selected from unstarted virtual machines and that is orchestrated for starting. Therefore, before the method is performed, an entire virtual machine system includes a started virtual machine (a quantity may be 0) and an unstarted virtual machine. In a process of performing the method, an entire virtual machine system includes a started virtual machine, a to-be-started virtual machine, and an unstarted virtual machine.

Step 103: Select at least one to-be-started virtual machine from unstarted virtual machines according to the distribution relationship obtained in 102, so that a total quantity of the $i^{th}$ type of VNFC included in a first group of virtual machines meets a corresponding preset quantity, where a set of the first group of virtual machines includes a started virtual machine and the at least one selected unstarted virtual machine, and the at least one unstarted virtual machine may be used as a to-be-started virtual machine set.

Step 104: Start the at least one to-be-started virtual machine determined in step 103.

The following uses a first service as an example for description. A VNFC set corresponding to the first service is {VNFC1, VNFC2, VNFC3, VNFC4}. The first service is not a specified service and is not intended to limit a sequence, but a service in a general sense. Any service whose implementation method principle that may make an equivalent replacement shall fall within the protection scope of the present disclosure.

Optionally, step 102 may be as follows. An attribute information table of any virtual machine includes a VNFC field, and a quantity of the $i^{th}$ type of VNFC running on the any virtual machine is recorded in the VNFC field; the quantity of the $i^{th}$ type of VNFC running on the any virtual machine is obtained by reading the VNFC field. Generally, the attribute information table is generated when the virtual machine is created. A special-purpose VNFC field may be set or an existing field may be replaced to record a correspondence between a virtual machine and a VNFC, as shown in the following table.

TABLE 1

| Field name | Description |
| --- | --- |
| VM type name | VM type name |
| Image | Software package loaded and run on a virtual machine |
| CPU resource | Required CPU resource |
| Memory resource | Required memory resource |
| Volume resource | Required storage resource |
| VNFC | Type and quantity of VNFCs running on the VM (a list) |
| . . . | Another field |

Optionally, step 102 may be as follows. Any virtual machine includes a software package, and a quantity of the $i^{th}$ type of VNFC is recorded in the software package; the any virtual machine obtains, by loading the software package, the quantity of the $i^{th}$ type of VNFC included in the any virtual machine, to learn a correspondence between a virtual machine and a VNFC. A description file in the software package is shown in the following table.

TABLE 2

| Field name | Description |
| --- | --- |
| Image name | Software package name |
| VNFC | Type and quantity of VNFCs included in the software package (a list) |
| . . . | Another field |

The correspondence between a virtual machine and a VNFC may include a virtual machine identifier and type identifiers of all VNFCs running on the virtual machine. Not only a VNFC running status on a virtual machine may be obtained, for example, VM0{10-VNFC000} indicates that 10 VNFCs 000 run on the virtual machine VM0, and VM1{10-VNFC000, 20-VNFC001, 30-VNFC100} indicates that 10 VNFCs 000, 20 VNFCs 001, and 30 VNFCs 100 run on the virtual machine VM1, but also a VNFC distribution in a virtual machine may be obtained, for example, VNFC000{10-VM0, 20-VM1, 30-VM3} indicates that quantities of VNFCs 000 distributed in the VM0, the VM1, and the VM3 are respectively 10, 20, and 30, and VNFC001{15-VM2, 25-VM3} indicates that quantities of VNFCs 001 distributed in the VM2 and the VM3 are respectively 15 and 25. It should be noted that the technical solution in the present disclosure sets no limitation to a specific configuration manner or storage manner of configuration data of the correspondence between a virtual machine and a VNFC and to a field expression mode.

Optionally, step 103 may be performing a "service assurance operation" according to the distribution relationship obtained in 102, where the "service assurance operation" may be as follows.

Determine whether the started virtual machine already includes four VNFC types corresponding to the first service.

If a determining result is that the started virtual machine does not include the four VNFC types corresponding to the first service, determine a type in the four VNFC types that is not included in the started virtual machine, that is, a type of VNFC that still needs to run to implement the first service, and then select L to-be-started virtual machines (L is not greater than 4) from the unstarted virtual machines, where the L to-be-started virtual machines include k VNFC types (k is not greater than 4 and not less than L) that are in the first VNFC set and have not been included in the started virtual machine. For example, the first service needs to be jointly implemented by VNFCs in a set {VNFC1, VNFC2, VNFC3, VNFC4}. If only a VNFC1 and a VNFC3 run on the started virtual machine, the first service cannot be implemented because a VNFC2 and a VNFC4 are also required. In this case, an unstarted virtual machine including the VNFC2 or the VNFC4 needs to be selected, an unstarted virtual machine on which both the VNFC2 and the VNFC4 run may be preferentially selected, and an unstarted virtual machine including larger quantities of VNFCs2 and VNFCs4 is the better one. If there is no unstarted virtual machine including both the VNFC2 and the VNFC4, an unstarted virtual machine including a maximum quantity of VNFCs2 may be selected first, and then an unstarted virtual machine including a maximum quantity of VNFCs4 is selected. A specific selection order is not limited. In a word, an unstarted virtual machine including a maximum quantity of a type of VNFC is selected, where the type of VNFC does not exist in the started virtual machine and the virtual machine that is already orchestrated for starting, until the started virtual machine and the L unstarted virtual machines include all the types of VNFCs corresponding to the first service. In an optional implementation manner, after the L to-be-started virtual machines are orchestrated, H to-be-started virtual machines are selected from unstarted virtual machines, where quantities of all the types of VNFCs that are included in the started virtual machine, the L to-be-started virtual machines, and the H to-be-started virtual machines and that are corresponding to the first service meet corresponding preset quantities.

If a determining result is that the started virtual machine includes the four VNFC types corresponding to the first service, select L to-be-started virtual machines from the unstarted virtual machines, where quantities of all the types of VNFCs that are included in the started virtual machine and the L to-be-started virtual machines and that are corresponding to the first service meet corresponding preset quantities. The implementation idea may be implemented using a simple addition principle. For example, quantities of VNFCs1, VNFCs2, VNFCs3, and VNFCs4 respectively reach 400, 300, 200, and 100 or more.

In another possible design, step 103 may be performing a "service high-efficiency operation" according to the distribution relationship obtained in step 102, where the "service high-efficiency operation" may include the following steps.

Step 1031: Determine an actual quantity weight $$\alpha_i = \frac{Qi}{\sum_{j=1}^{N} Qj}$$

of the $i^{th}$ type of VNFC, where Qi is a total quantity of the $i^{th}$ type of VNFC in a second group of virtual machines, Qj is a total quantity of a $j^{th}$ type of VNFC in the second group of virtual machines, a value range of j includes all positive integers not greater than N, and the second group of virtual machines mentioned in the present disclosure include a currently started virtual machine and currently selected to-be-started virtual machines.

Step 1032: Find, according to the actual quantity weight $\alpha_i$ of the $i^{th}$ type of VNFC and a preset quantity weight of the $i^{th}$ type of VNFC, a $k^{th}$ type whose actual quantity weight is less than a preset quantity weight of the $k^{th}$ type to a maximum degree, where the $k^{th}$ type is one of the N types.

Step 1033: Select a virtual machine including the $k^{th}$ type of VNFC as a new to-be-started virtual machine; and if multiple virtual machines include a maximum quantity of the $k^{th}$ type of VNFC, select a virtual machine with a maximum quantity of VNFC types of the N types from the multiple virtual machines, or select a virtual machine including a maximum total quantity of VNFCs corresponding to the first service, where the VNFCs corresponding to the first service are all the types of VNFCs of the N VNFC types.

Repeat step 1031, step 1032, and step 1033, until the total quantity of the $i^{th}$ type of VNFC included in the first group of virtual machines meets the corresponding preset quantity. As a supplementary description, the second group of virtual machines in this application document may further be understood as a current first group of virtual machines in a new round of computing performed each time, that is, each time a new to-be-started virtual machine is selected through orchestration, the first group of virtual machines are updated in real time.

The following provides description using an example. In a specific implementation process, in a simplest case, there is one unstarted virtual machine, and quantities of all components included in the unstarted virtual machine are sufficient to meet predetermined quantities. However, the case is rare or there is almost no such case. In most actual cases, to run all types of VNFCs whose predetermined quantities are reached, many unstarted virtual machines need to be started, and generally, at least several hundreds of unstarted virtual machines need to be started. In this case, a problem of determining unstarted virtual machines that need to be first started in the multiple unstarted virtual machines needs to be resolved. As mentioned above, a service provider obtains, by means of statistics collection of a large quantity of user habits, a basic quantity relationship that is of all components and that satisfies a user requirement. For example, predetermined quantities of VNFCs1, VNFCs2, VNFCs3, and VNFCs4 required by the first service are respectively 400, 300, 200, and 100. However, 400, 300, 200, and 100 are merely final values, and the started virtual machine cannot reach the quantity relationship immediately. To-be-started virtual machines are started gradually, and the quantities gradually approach to the predetermined quantities. It is easy to learn from the final quantities that when a quantity ratio of the four types of components, the VNFC1, the VNFC2, the VNFC3, and the VNFC4, meets a condition of 400:300:200:100 (that is, 4:3:2:1), implementation efficiency of the first service is the highest. Therefore, each type of component has a preset quantity weight, and predetermined quantity weights of the VNFC1, the VNFC2, the VNFC3 and the VNFC4 are respectively:

$R_{VNFC1}=4/(1+2+3+4)=0.4;$ $R_{VNFC2}=3/(1+2+3+4)=0.3;$ $R_{VNFC3}=2/(1+2+3+4)=0.2;$ and $R_{VNFC4}=1/(1+2+3+4)=0.1.$ In an actual case, quantities of each type of VNFC included in a to-be-started virtual machine that is currently being orchestrated for starting (that is, the currently selected to-be-started virtual machine) and the currently started virtual machine do not meet the ratio at every moment, but dynamically fluctuate in most of time. Therefore, service implementation efficiency depends on a VNFC that is of these VNFCs and whose actual quantity weight is less than a preset quantity weight. Current actual quantity weights of the VNFC1, the VNFC2, the VNFC3, and the VNFC4 need to be determined first. For example, at a moment, actual quantities of VNFCs1, VNFCs2, VNFCs3, and VNFCs4 running on the second group of virtual machines (that is, the currently started virtual machine and the to-be-started virtual machine that is currently being orchestrated for starting) are 50, 10, 10, and 30, and correspondingly, the actual quantity weights are:

$R'_{VNFC1} = 50/(50+10+10+30) = 0.5;$ $R'_{VNFC2} = 10/(50+10+10+30) = 0.1;$ $R'_{VNFC3} = 10/(50+10+10+30) = 0.1;$ and $R'_{VNFC4} = 30/(50+10+10+30) = 0.3.$ Degrees of deviation of the actual quantity weights from the preset quantity weights of these VNFCs in the second group of virtual machines may be evaluated using a formula $S=(R'-R)/R$. At this moment, the degrees of deviation of the actual quantity weights from the preset quantity weights of the VNFC1, the VNFC2, the VNFC3, and the VNFC4 in the second group of virtual machines are correspondingly:

$S_{VNFC1} = (0.5-0.4)/0.4 = +25\%;$ $S_{VNFC2} = (0.1-0.3)/0.3 = -66.7\%;$ $S_{VNFC3} = (0.1-0.2)/0.2 = -50\%;$ and $S_{VNFC4} = (0.3-0.1)/0.1 = +200\%.$ It is easy to learn that a positive deviation result indicates that this type of VNFC is excessive, and a larger positive value result indicates a higher excess degree; and a negative deviation result indicates that this type of VNFC is few, and a smaller negative value result indicates a higher scarcity degree. In this example, it can be learned that, for current quantity distribution of VNFCs, the VNFCs1 and the VNFCs4 in the second group of virtual machines are relatively excessive, and especially, the VNFCs4 are relatively more; and the VNFCs2 and the VNFCs3 are relatively few, and especially, a scarcity degree is maximum for the VNFCs2. Therefore, to enable that the first service can make full use of current VNFC resources as quickly as possible, a method for improving utilization efficiency of the current VNFCs as quickly as possible is to first increase the quantity of VNFCs2. In this case, an unstarted virtual machine including a VNFC2 needs to be selected, and a virtual machine including a maximum quantity of VNFCs2 is preferentially selected. If multiple unstarted virtual machines include the maximum quantity of VNFCs2, a probability is higher to preferentially select a virtual machine that is of these unstarted virtual machines and that includes a larger quantity of other VNFC types or a larger quantity of other types of VNFCs. For example, an unstarted virtual machine including the maximum quantity of VNFCs2 and including a VNFC3 is preferentially selected, or an unstarted virtual machine including the maximum quantity of VNFCs2 and including the VNFC1, the VNFC3, and the VNFC4 is preferentially selected. In a word, a virtual machine that can supplement a scarce VNFC resource as quickly as possible has a high selection priority, especially a virtual machine that can supplement all scarce VNFC resources. Each time a new to-be-started virtual machine is selected, VNFC distribution in the second group of virtual machines is updated, and the system also calculates and updates the degrees of deviation of the actual quantity weights from the preset quantity weights of the VNFCs in the second group of virtual machines. A result after each update is different. Therefore, in a process of selecting virtual machines one by one for orchestration, both a positive or a negative and a deviation magnitude of a deviation degree of each VNFC component change dynamically. A preferred selection mechanism used after each update and calculation is as described above. Therefore, the VNFCs of current quantities can implement respective maximum efficiency in a selection process, until all the types of VNFCs in the first group of virtual machines reach the predetermined quantities. For example, after several virtual machines are started continuously, required quantities of VNFCs1, VNFCs2, VNFCs3, and VNFCs4 respectively reach 400, 300, 200, and 100, and it is indicated that, in this case, the first group of virtual machines can satisfy a user requirement for the first service, subsequent selection of a to-be-started virtual machine may no longer be limited by an order constraint, and can be performed in a random manner.

Correspondingly, to-be-started virtual machines are selected according to a selection order, and an order for starting these to-be-started virtual machines is the same as the selection order. For example, in a process of repeating step 1031 to step 1033, each time step 1031 to step 1033 are performed, a most appropriate to-be-started virtual machine may be selected for orchestration, to be included in a start sequence. After step 1031 to step 1033 are performed for multiple times, there is a selection order of the to-be-started virtual machines. Correspondingly, an earlier selected to-be-started virtual machine is ranked higher in the start sequence and is started earlier. In a virtual machine start mechanism, the selected to-be-started virtual machines are started according to the order.

Optionally, a virtual machine start manner is as follows. First, an orchestration order for starting the to-be-started virtual machines is obtained. Next, a start operation is performed on the to-be-started virtual machines according to the start order. If to-be-started virtual machines are excessive, for example, exceed a quantity limited by a boot storm, assuming that the limited quantity is c, c virtual machines are started quickly. A running status of each virtual machine is different, and therefore, starting time thereof is different. If c to-be-started virtual machines are started simultaneously at a moment, a to-be-started virtual machine ranked behind of the c to-be-started virtual machines cannot be started immediately. Similar to a stack overflow manner, only after starting of a virtual machine that is currently being started is completed, a next virtual machine in a to-be-started sequence can be started. In the method, undoubtedly, maximum efficiency of a VNFC in the started virtual machine can still be implemented under a virtual machine boot storm constraint.

The foregoing deviation degree calculation algorithm is merely used as an example for description. Other calculation manners may further be derived and transformed from the algorithm according to a mathematical principle, and are not listed one by one in this embodiment of the present disclosure. In addition, in a process of selecting a virtual machine, when multiple unstarted virtual machines meet a condition, for example, when types and quantities of VNFCs running on two unstarted virtual machines meeting a condition are the same, one of the multiple unstarted virtual machines may be selected in a random manner. Any simple equivalentlyreplaced solution without creative efforts shall fall within the protection scope of the present disclosure.

In a specific implementation process, step 103 may further be implemented in multiple manners, and multiple implementation manners may be obtained through deriving because of different service policies preset in the system. For example, in a process (not limited to the entire process, but including a part of the process) of selecting at least one to-be-started virtual machine, polling may be repeated for selecting currently unstarted virtual machines according to an order of maximum quantities of included VNFCs1, VNFCs2, VNFCs3, and VNFCs4, or polling may be performed for selecting currently unstarted virtual machines according to a descending order of total quantities of VNFCs included in the virtual machines, or polling may be performed for selecting currently unstarted virtual machines according to a descending order of quantities of VNFC types included in the virtual machines, until the $i^{th}$ type of VNFC included in the started virtual machine and the to-be-started virtual machines orchestrated for starting reaches the predetermined quantity. It should be noted that, in any one of the foregoing cases, when multiple virtual machines meet a same filtering condition, one of the multiple virtual machines may be selected in a random manner or according to an algorithm rule.

According to the virtual machine start method provided in this embodiment of the present disclosure, a to-be-started virtual machine is pertinently selected according to a distribution relationship between VNFCs and virtual machines and according to a rule, and is correspondingly started according to a selection order. Therefore, service performance can be improved and a VNFC resource in a current started virtual machine can be fully used in a relatively short time, and maximum utilization efficiency can be implemented under a condition that there are few VNFC resources.

Figure 5:
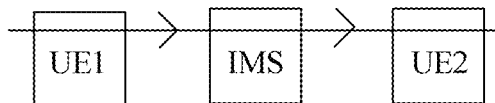
FIG. 5 is a diagram of a correspondence between VNFs and VNFCs in a session control service according to an embodiment of the present disclosure.
Figure 5:
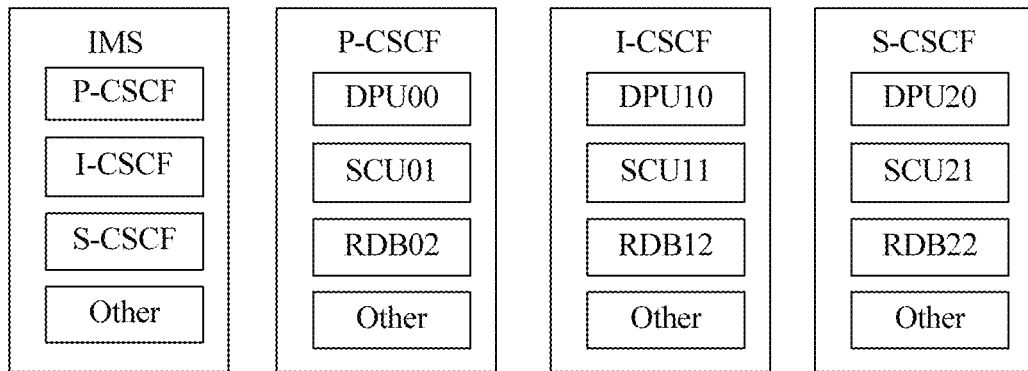

For ease of understanding the present disclosure more clearly, the following provides detailed description using an actual application example. Referring to FIG. 5, FIG. 5 is a diagram of a correspondence between a VNF and a VNFC in a session control service according to an embodiment of the present disclosure.

In a simple Internet Protocol (IP) multimedia subsystem (IMS) session control service, a terminal UE1 initiates a voice call, and a voice signal passes through an IMS and arrives at a terminal UE2. The IMS includes a Proxy-Call Session Control Function (P-CSCF), an Interrogating Call Session Control Function (I-CSCF), and a Serving Call Session Control Function (S-CSCF).

(1) Proxy CSCF (P-CSCF)

The P-CSCF is the proxy call session control function. The P-CSCF is an ingress node connecting an IMS terminal and an IMS network. Session Initiation Protocol (SIP) signaling that is initiated by all IMS terminals or terminated on an IMS terminal needs to pass through the P-CSCF. Actually, the P-CSCF plays a role of a proxy server. The P-CSCF receives a SIP request or response, and forwards the SIP request or response to the IMS network or an IMS user. The P-CSCF may be located on a visited network, or may be located on a home network.

(2) Interrogating CSCF (I-CSCF)

The I-CSCF is the interrogating call session control function. The I-CSCF is an ingress node using which an IMS terminal located on a visited network enters a local IMS network domain. The I-CSCF routes a SIP request or response of a foreign terminal to a local S-CSCF. The I-CSCF is located on a home network, or may be located on a visited network in a special case.

(3) Serving CSCF (S-CSCF): The S-CSCF is the serving call session control function. The S-CSCF is a central node on a SIP signaling plane. A function of the S-CSCF is similar to that of a softswitch device in a softswitch system. The S-CSCF performs a session control service for an IMS terminal, and keeps a session state. SIP signaling sent and received by all IMS terminals needs to pass through the S-CSCF. The S-CSCF checks the SIP signaling, determines whether an application server needs to be accessed, and forwards the signaling to a final destination. The S-CSCF is always located on a home network.

The P-CSCF, the I-CSCF, and the S-CSCF have a dispatching unit (DPU), a session control unit (SCU), and a remote distributed database (RDB) that are necessary to complete a voice call service. The DPU is external egress and ingress of a CSCF system and configured to complete dispatching of a SIP message. The SCU is configured to complete a service processing function of each logical network element. The RDB is configured to complete distributed storage of user data and session data, to implement separation between data and a program.

In the voice call service, corresponding VNFs are the P-CSCF, the I-CSCF, and the S-CSCF. The P-CSCF, the I-CSCF, and the S-CSCF have their own corresponding processes/software modules. The processes/software modules are VNFCs, such as, a DPU00, an SCU01, and an RDB02 in the P-CSCF, a DPU10, an SCU11, and an RDB12 in the I-CSCF, and a DPU20, an SCU21, and an RDB22 in the S-CSCF. Certainly, the P-CSCF, the I-CSCF, and the S-CSCF also have some other VNFCs that have additional functions and that are not necessary in the voice call. Therefore, this embodiment provides no details.

According to the solution of the present disclosure, VNFC types determined according to the voice call service are the DPU00, the SCU01, the RDB02, the DPU10, the SCU11, the RDB12, the DPU20, the SCU21, and the RDB22. For example, an operator needs to complete deployment of a voice call service and expects that quantities of DPUs 00, SCUs 01, RDBs 02, DPUs10, SCUs11, RDBs12, DPUs20, SCUs21, and RDBs22 are respectively 1000, 2500, 1500, 600, 1500, 900, 400, 1000, and 600. That is, corresponding preset weights of the DPU00, the SCU01, the RDB02, the DPU10, the SCU11, the RDB12, the DPU20, the SCU21, and the RDB22 are respectively 10%, 25%, 15%, 6%, 15%, 9%, 4%, 10%, and 6%.

A virtualized network function management and orchestration system learns distribution relationships of the foregoing nine types of VNFCs in each virtual machine by reading attribute information of each virtual machine, that is, learns quantities of the foregoing nine types of VNFCs distributed in a started virtual machine, and quantities of the foregoing nine types of VNFCs distributed in an unstarted virtual machine. In addition, initial actual weights of the DPU00, the SCU01, the RDB02, the DPU10, the SCU11, the RDB12, the DPU20, the SCU21, and the RDB22 in the started virtual machine are calculated.

A VNFC, for example, the SCU01, whose initial actual weight is less than a preset quantity weight to a maximum deviation degree (relatively most scarce) is selected. Then, an unstarted virtual machine including the SCU01 is determined according to the distribution relationship, and an unstarted virtual machine including a maximum quantity of SCUs 01 is selected from unstarted virtual machines as a new to-be-started virtual machine. If multiple unstarted virtual machines include a same maximum quantity of SCUs 01, an unstarted virtual machine including a maximum total quantity of the nine types of VNFCs may be selected from the multiple unstarted virtual machines, or an unstarted virtual machine including a maximum quantity of types among the nine types of VNFCs may be selected from the multiple unstarted virtual machines. If multiple unstarted virtual machines include a same type of VNFC and a quantity of VNFCs of each type is also the same, one of the multiple unstarted virtual machines may be selected in a random manner. After selection of the new to-be-started virtual machine is complete, a new virtual machine is added to a second group of virtual machines. Therefore, quantities of DPUs 00, SCUs 01, RDBs 02, DPUs 10, SCUs 11, RDBs 12, DPUs 20, SCUs 21, and RDBs 22 in the second group of virtual machines change, and actual weights are updated. A new to-be-started virtual machine is selected based on the new actual weights and according to a rule equivalent to the foregoing method. Each time a virtual machine is selected, a new to-be-started virtual machine is selected based on new actual weights and according to a same rule, and polling is repeated for multiple times, until quantities of DPUs 00, SCUs 01, RDBs 02, DPUs 10, SCUs 11, RDBs 12, DPUs 20, SCUs 21, and RDBs 22 in a first group of virtual machines respectively reach 1000, 2500, 1500, 600, 1500, 900, 400, 1000, and 600 or more. If a standby unstarted virtual machine still needs to be orchestrated for starting subsequently, the virtual machine may be selected according to the rule equivalent to the foregoing method, or a start order may be determined in a random manner.

2. Multi-Service Scenario

A multi-service is that an NFV network supports services with multiple different service priorities. VNFC sets of services of different service types are different. In some scenarios, when large quantities of VMs on which VNFCs corresponding to a high-priority service run and VMs on which VNFCs corresponding to a low-priority service run are started simultaneously, a factor considered to first start a virtual machine is more complex, and the present disclosure provides a corresponding technical solution according to an actual requirement policy of a user on a service. A multi-service type may mean that there are A types of services with a service priority of an SLA availability level on the NFV network. A purpose of starting virtual machines in this case is to implement B types of specified services of the a types of services, where B is less than or equal to A, and both A and B are positive integers.

For example, starting virtual machines in batches at one time is to satisfy a requirement of a user for a second service, a third service, and a fourth service. The second service needs to be jointly implemented by VNFCs in a set {VNFC21, VNFC22, VNFC23, VNFC24}, the third service needs to be jointly implemented by VNFCs in a set {VNFC31, VNFC32, VNFC33}, and the fourth service needs to be jointly implemented by VNFCs in a set {VNFC41, VNFC42}. It can be learn that in a multi-service requirement, a great variety of VNFCs are involved, and according to an existing virtual machine start manner, a started VNFC resource cannot be fully used in a start process because distribution of a VNFC is not determined. Therefore, in the present disclosure, starting virtual machines in an environment with a multi-service requirement is also planned. A specific solution is as follows.

Figure 6:
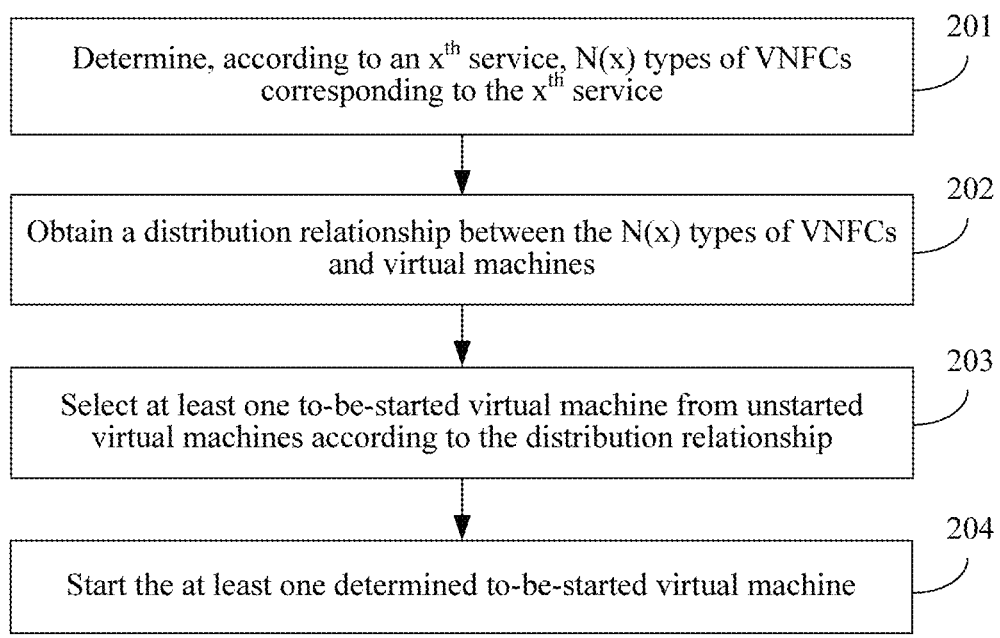
FIG. 6 is a schematic flowchart of a virtual machine start method in a multi-service scenario according to an embodiment of the present disclosure.

Referring to FIG. 6, FIG. 6 is a schematic flowchart of a virtual machine start method in a multi-service scenario according to an embodiment of the present disclosure. The method is applied to a network function virtualization NFV network that has M network service requirements, where M is a natural number greater than 1. The method 200 includes the following steps.

Step 201: Determine, according to an $x^{th}$ service, N(x) types of VNFCs corresponding to the $x^{th}$ service, where the $x^{th}$ service is one network service in M network services, the N(x) types of VNFCs can jointly implement the $x^{th}$ service, N is a positive integer, and a value range of x includes all positive integers not greater than M.

Step 202: Obtain a distribution relationship between the N(x) types of VNFCs and virtual machines, where the distribution relationship indicates a quantity of an $xi^{th}$ type of VNFC distributed in each virtual machine, each virtual machine includes a started virtual machine or an unstarted virtual machine, the $xi^{th}$ type is one of the N(x) types, and a value range of xi includes all positive integers not greater than N(x).

Step 203: Select at least one to-be-started virtual machine from unstarted virtual machines according to the distribution relationship obtained in 202, so that a total quantity of the $xi^{th}$ type of VNFC included in a first group of virtual machines meets a corresponding preset quantity, where a set of the first group of virtual machines includes a started virtual machine and the at least one to-be-started virtual machine, and the at least one to-be-started virtual machine may be used as a to-be-started virtual machine set.

Step 204: Start the at least one to-be-started virtual machine determined in step 203.

Optionally, in a specific implementation process, if in a policy, a service has no absolute priority, for example, a service that has an absolute priority is not distinguished from a second service, a third service, and a fourth service, no attention is paid to whether expected performance standard of a service is bound to be preferentially met, and instead, a target is that each type of VNFC in each service reaches an estimated quantity. In this case, step 203 may be performing a "service high-efficiency operation" according to the distribution relationship obtained in step 202, where the "service high-efficiency operation" may include the following steps.

Step 2031a: Determine an actual quantity weight $$\alpha_{xi} = \frac{Qxi}{\sum_{xj=1}^{N} Qxj}$$

of the $xi^{th}$ type of VNFC, where Qxi is a total quantity of the $xi^{th}$ type of VNFC in a second group of virtual machines, Qxj is a total quantity of an $xj^{th}$ type of VNFC in the second group of virtual machines, a value range of xj includes all positive integers not greater than N(x), and the second group of virtual machines include a currently started virtual machine and currently selected to-be-started virtual machines.

Step 2032a: Find, according to the actual quantity weight $\alpha_{xi}$ of the $xi^{th}$ type of VNFC and a preset quantity weight of the $xi^{th}$ type of VNFC, a $k^{th}$ type whose actual quantity weight is less than a preset quantity weight of the $k^{th}$ type to a maximum degree.

Step 2033a: Select an unstarted virtual machine including the $k^{th}$ type of VNFC as a new to-be-started virtual machine.

Repeat step 2031a, step 2032a, and step 2033a, until the total quantity of the $xi^{th}$ type of VNFC included in the first group of virtual machines meets the corresponding preset quantity. As a supplementary description, the second group of virtual machines in this application document may further be understood as a current first group of virtual machines in a new round of computing performed each time, that is, each time a new to-be-started virtual machine is selected through orchestration, the first group of virtual machines are updated in real time.

In another specific implementation process, if in a policy, a service has an absolute priority, for example, a priority of a second service is higher than a priority of a third service, and the priority of the third service is higher than a priority of a fourth service, an expected service capability of the second service needs to be satisfied first. That is, after quantities of all types of VNFCs in the second service reach corresponding preset quantities, the third service is concerned; after quantities of all types of VNFCs in the third service reach corresponding preset quantities, the fourth service is concerned, and quantities of all types of VNFCs in the fourth service reach corresponding preset quantities. In this case, step 203 may include determining a descending order of priorities of the M services, and successively performing a "service enabling operation" on all services in the M services according to the descending order of priorities, where the "service enabling operation" includes the following steps.

Step 2031b: Determine an actual quantity weight $$\alpha_{xi} = \frac{Qxi}{\sum_{xj=1}^{N} Qxj}$$

of the $xi^{th}$ type of VNFC in a current service, where Qxi is a total quantity of the $xi^{th}$ type of VNFC that is in a second group of virtual machines and that is in the current service, Qxj is a total quantity of an $xj^{th}$ type of VNFC that is in the second group of virtual machines and that is in the current service, a value range of xj includes all positive integers not greater than N(x) corresponding to the current service, and the second group of virtual machines include a currently started virtual machine and currently selected to-be-started virtual machines.

Step 2032b: Find, according to the actual quantity weight $\alpha_{xi}$ of the $xi^{th}$ type of VNFC in the current service and a preset quantity weight of the $xi^{th}$ type of VNFC in the current service, a $k^{th}$ type whose actual quantity weight is less than a preset quantity weight of the $k^{th}$ type to a maximum degree.

Step 2033b: Select an unstarted virtual machine including the $k^{th}$ type of VNFC as a new to-be-started virtual machine.

Repeat step 2031b, step 2032b, and step 2033b, until a total quantity of the $xi^{th}$ type of VNFC that is included in the first group of virtual machines and that is in the current service meets the corresponding preset quantity.

In a specific implementation process of the foregoing method, when a virtual machine including the $k^{th}$ type of VNFC is selected from unstarted virtual machines as a new to-be-started virtual machine, an unstarted virtual machine including a maximum quantity of the $k^{th}$ type of VNFC may be selected. If multiple unstarted virtual machines include the maximum quantity of the $k^{th}$ type of VNFC, an unstarted virtual machine including a maximum quantity of VNFC types is selected from the multiple unstarted virtual machines, or an unstarted virtual machine including a maximum quantity of VNFCs (non-categorical) is selected from the multiple unstarted virtual machines. In addition, in a process of selecting a virtual machine, when multiple unstarted virtual machines have a same VNFC running status, for example, when types and quantities of VNFCs running on two unstarted virtual machines meeting a condition are the same, one of the multiple unstarted virtual machines may be selected in a random manner.

In a process of repeating step 2031a to step 2033a or step 2031b to step 2033b, each time step 2031a to step 2033a or step 2031b to step 2033b are performed, a relatively most appropriate unstarted virtual machine is selected and is added to a to-be-started sequence. After step 2031a to step 2033a or step 2031b to step 2033b are performed for multiple times, there is a selection order for selected to-be-started virtual machines in the sequence. An orchestration mechanism for starting virtual machines enables that these selected to-be-started virtual machines can be started subsequently according to the order.

In a specific implementation process, a policy predetermined by a system further needs to be referenced in a specific process of performing step 203. Multiple implementation manners may be derived from step 203 because of different preset multi-service policies. For example, in a process of selecting at least one to-be-started virtual machine, for each type of VNFC corresponding to multiple services, polling is repeated for selecting unstarted virtual machines according to an order of maximum quantities of the currently included type of VNFC; or polling may be repeated for selecting unstarted virtual machines according to a descending order of total quantities of VNFCs included in the virtual machines; or polling may be repeated for selecting unstarted virtual machines according to a descending order of quantities of VNFC types included in the virtual machines. It should be noted that, in any one of the foregoing cases, when multiple unstarted virtual machines meet a same filtering condition, one of the multiple unstarted virtual machines may be selected in a random manner.

This embodiment of the present disclosure may be applied in a network initialization phase, that is, all virtual machines have not run. In this case, the virtual machines may be started according to a service. This embodiment of the present disclosure may further be applied in a network running phase. For example, after the virtual machines are started according to a virtual machine order or a host order in the prior art, in the network running phase, if multiple virtual machines are newly added, or multiple virtual machines are recovered from a large-scale interrupt fault, the newly added virtual machines or the interrupted virtual machines need to be started according to the service.

In this embodiment of the present disclosure, N VNFC types corresponding to a first service are determined, a to-be-started virtual machine of virtual machines that need to be started is determined according to a distribution relationship between N types of VNFCs and virtual machines, and the to-be-started virtual machine is started. In the present disclosure, virtual machines on which VNFC types corresponding to a specified service run may be started as quickly as possible, so that a problem, caused during limiting a starting quantity of virtual machines to avoid a virtual machine boot storm, that a service cannot be provided for a long time or a service processing capability cannot be improved for a long time can be resolved, the service is quickly provided, and the service processing capability is quickly improved. In addition, according to the single/multi-service policy mentioned in the foregoing method, an unstarted virtual machine on which a most scarce type of VNFC is located can be selected according to a VNFC quantity status in a current virtual machine, so that utilization efficiency of a VNFC that runs on a currently started virtual machine and that is in a current service can be fully implemented in each period of time, and system performance is improved.

Figure 7A:
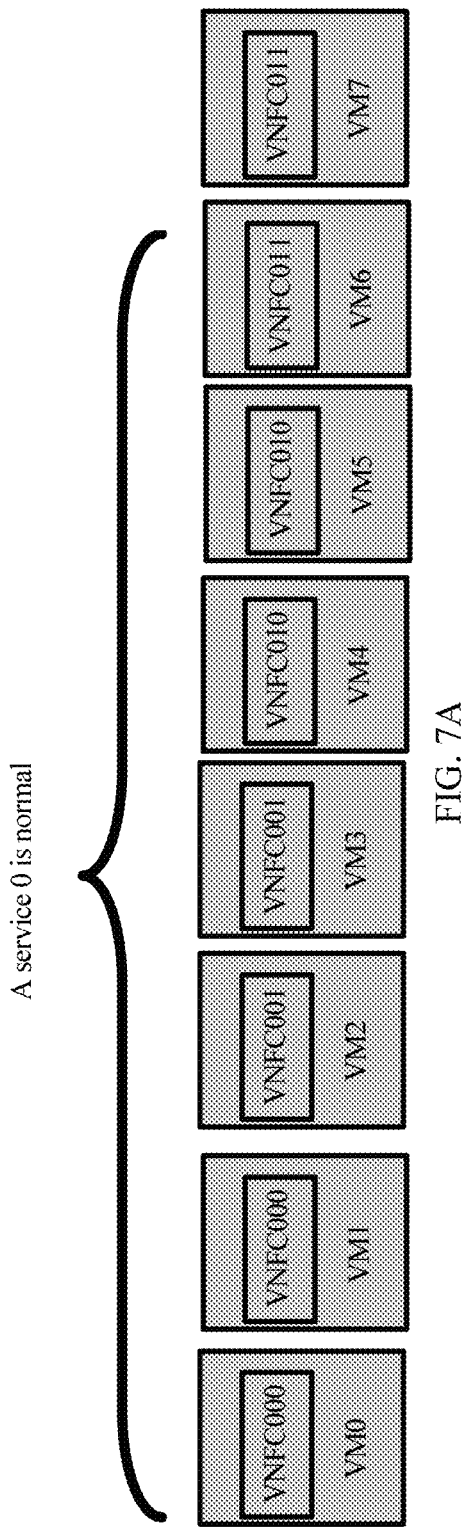
FIG. 7A and FIG. 7B show comparison examples of orchestrating virtual machines using the prior art and the method in the present disclosure.
Figure 7B:
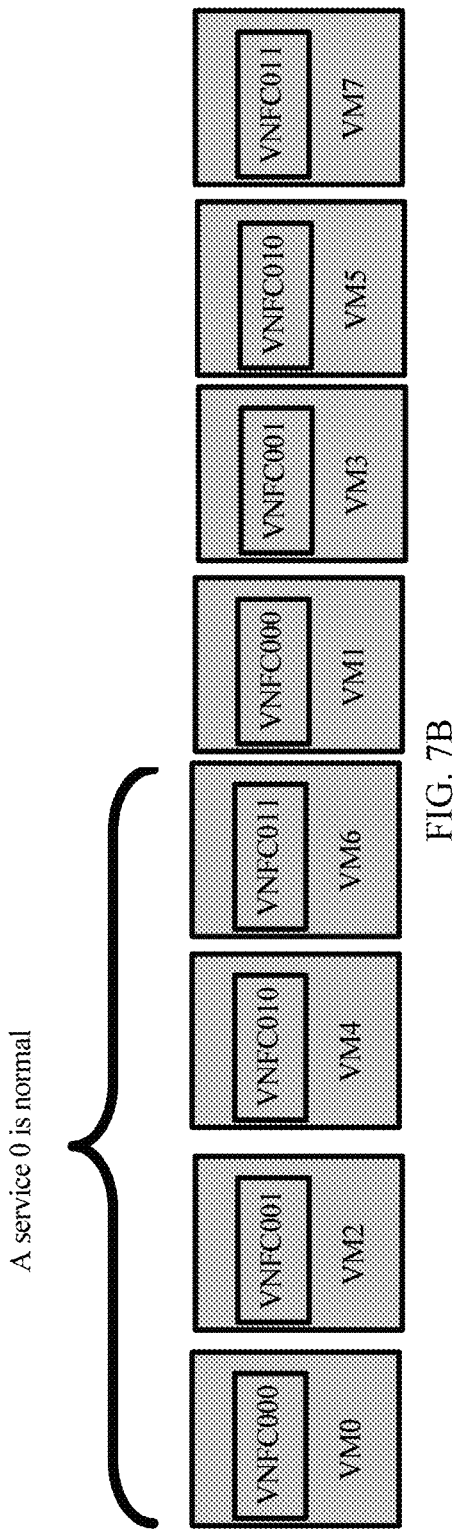

In a simple example, VNFC types corresponding to a service 0 are a VNFC000, a VNFC001, a VNFC010, and a VNFC011, and a status of VNFCs included in eight virtual machines, a VM0 to a VM7, that are not started initially are shown in FIG. 7A (VNFCs unrelated to the service 0 are not shown in this figure). If the virtual machines are orchestrated for starting according to an order of virtual machine numbers (shown in FIG. 7A) in the prior art, only after seven virtual machines, the VM0 to a VM6, are orchestrated and started, the service 0 can run normally. If selection is performed according to the method in this embodiment of the present disclosure, that is, a virtual machine with a most scarce type of VNFC corresponding to the service 0 is selected, and as long as four virtual machines, the VM0 (or a VM1), a VM2 (or the VM3), a VM4 (or a VM5), and the VM6 (or the VM7) are started, the service 0 can run normally. A possible implementation manner is shown in FIG. 7B. Therefore, in the present disclosure, as long as a minimum quantity of unstarted virtual machines are started, a service can be provided as quickly as possible, thereby shortening time for providing the service.

Figure 8:
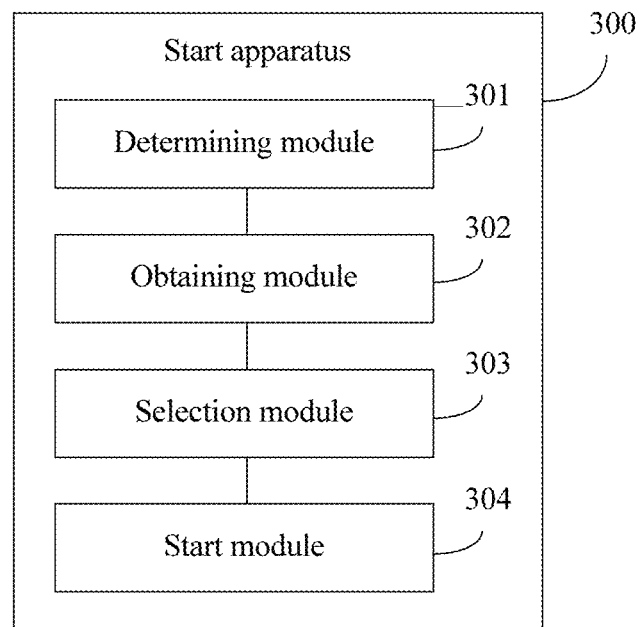
FIG. 8 is a schematic structural diagram of a virtual machine start apparatus according to an embodiment of the present disclosure.

Referring to FIG. 8, FIG. 8 is a schematic structural diagram of a virtual machine start apparatus according to an embodiment of the present disclosure. The apparatus 300 includes a determining module 301, an obtaining module 302, a selection module 303, and a start module 304. There are multiple possible implementation manners. Therefore, the following continues to describe the apparatus using examples, and any technical solution that may make an equivalent replacement shall fall within the protection scope of the present disclosure.

Example 1

A virtual machine start apparatus is provided, and the apparatus is applied to a NFV network that has a single network service requirement (a scenario in which a single-service type is required is described as above, and a first service continues to be used as an example in Example 1), and the apparatus 300 includes a determining module 301 configured to determine N types of VNFCs according to the first service, where the first service is a network service in many network services that can be implemented by virtual machines, the N types of VNFCs can jointly implement the first service, and N is a positive integer; an obtaining module 302 configured to obtain a distribution relationship between the N types of VNFCs determined by the determining module 301 and virtual machines, where the distribution relationship indicates a quantity of an $i^{th}$ type of VNFC distributed in each virtual machine, each virtual machine includes a started virtual machine or an unstarted virtual machine, the $i^{th}$ type is one of the N types, and a value range of i includes all positive integers not greater than N; a selection module 303 configured to select at least one to-be-started virtual machine from unstarted virtual machines according to the distribution relationship obtained by the obtaining module 302, so that a total quantity of the $i^{th}$ type of VNFC included in a first group of virtual machines meets a corresponding preset quantity, where a set of the first group of virtual machines includes a started virtual machine and the at least one to-be-started virtual machine; and a start module 304 configured to start the at least one to-be-started virtual machine selected by the selection module 303.

In a specific implementation process, the obtaining module 302 obtains the distribution relationship between the N types of VNFCs and virtual machines in multiple manners. For two typical manners, reference may be made to the implementation methods corresponding to Table 1 and Table 2 in the foregoing embodiment.

In a specific implementation process, different from a conventional virtual machine start apparatus, the selection module 303 in the present disclosure plays a very critical role and may select an unstarted virtual machine according to the distribution relationship obtained by the obtaining module 302 and orchestrate the unstarted virtual machine as a to-be-started virtual machine. An optional manner is as follows: y unstarted virtual machines may be first selected using an addition theory, so that a total quantity of the $i^{th}$ type of VNFC running on the y virtual machines and on the started virtual machine reaches a corresponding predetermined quantity. The selection module 303 has multiple implementation manners, and the multiple implementation manners may be obtained through deriving because of different service policies stored inside or invoked by the selection module 303. The first service in the foregoing embodiment is still used as an example. For example, polling is repeated for selecting according to an order of a VNFC1, a VNFC2, a VNFC3, and a VNFC4: (step 1: select an unstarted virtual machine including the VNFC1; step 2: select an unstarted virtual machine including the VNFC2; step 3: select an unstarted virtual machine including the VNFC3; step 4: select an unstarted virtual machine including the VNFC4; and repeat step 1 to step 4, until quantities of all the types of VNFCs that are included in the started virtual machine and to-be-started virtual machines orchestrated for starting can meet predetermined quantities of all the types of VNFCs corresponding to the first service). In a polling process, because a quantity of virtual machines including the VNFC1 is greater than 1, an unstarted virtual machine including a maximum quantity of VNFCs1 may be preferentially selected, and a similar manner is applicable to other types of VNFCs. For another example, successive selection may be performed according to a descending order of total quantities of VNFCs included in virtual machines, or successive selection may be performed according to a descending order of quantities of VNFC types included in virtual machines. It should be noted that, in any one of the foregoing cases, when multiple unstarted virtual machines meet a same filtering condition, one of the multiple unstarted virtual machines may be selected in a random manner. Correspondingly, the start module 304 may successively start selected to-be-started virtual machines according to a selection order of the to-be-started virtual machines. Compared with a conventional manner for starting virtual machines according to a sequence number, selecting virtual machines according to the distribution relationship is more quickly and pertinently. Therefore, the target that the total quantity of the $i^{th}$ type of VNFC in the first service reaches the predetermined quantity can be achieved more quickly, and a service capability of the first service can achieve an expected effect as quickly as possible.

In a possible design, the selection module 303 may perform, according to the distribution relationship obtained by the obtaining module 302, a "service assurance operation" in the foregoing embodiment, an instance corresponding to the method, and all implementation manners that may make an equivalent replacement.

In another possible design, the selection module 303 may perform, according to the distribution relationship obtained by the obtaining module 302, a "service high-efficiency operation" in the foregoing embodiment, that is, the method described in step 1031 to step 1033, an instance corresponding to the method, and all implementation manners that may make an equivalent replacement.

Figure 9:
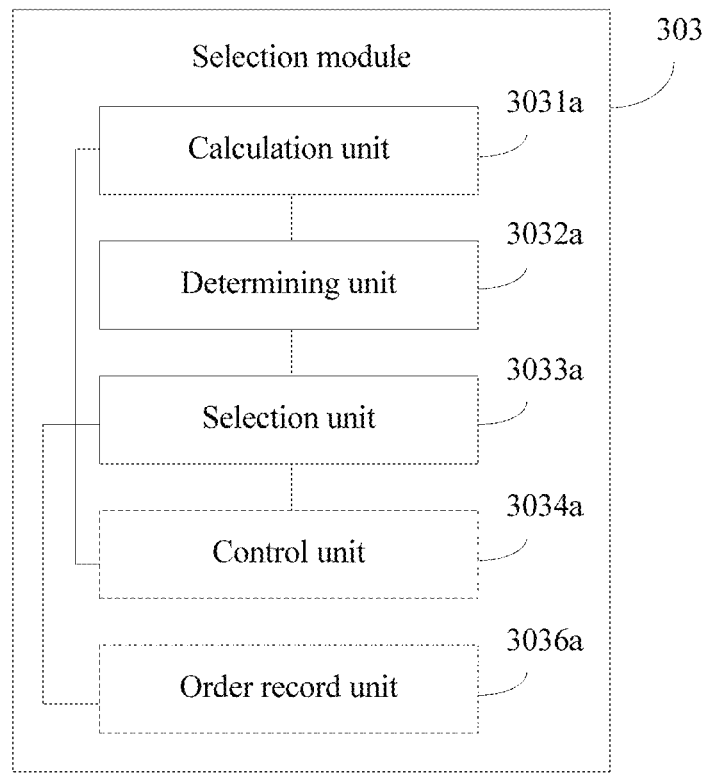
FIG. 9 is a schematic diagram of a selection module in a virtual machine start apparatus according to an embodiment of the present disclosure.

In a possible design, for a form of the selection module 303, reference may be made to FIG. 9. FIG. 9 is a schematic diagram of a selection module 303 in a virtual machine start apparatus according to an embodiment of the present disclosure. The apparatus is applied to a network function virtualization NFV network that has a single network service requirement. A specific implementation manner is as follows. The selection module 303 includes a calculation unit 3031*a*, a determining unit 3032*a*, and a selection unit 3033*a*.

The calculation unit 3031*a* is configured to determine an actual quantity weight $$\alpha_i = \frac{Qi}{\sum_{j=1}^{N} Qj}$$

of the $i^{th}$ type of VNFC, where Qi is a total quantity of the $i^{th}$ type of VNFC in a second group of virtual machines, Qj is a total quantity of a $j^{th}$ type of VNFC in the second group of virtual machines, a value range of j includes all positive integers not greater than N, and the second group of virtual machines include a currently started virtual machine and currently selected to-be-started virtual machines.

The determining unit 3032*a* is configured to find, according to a preset quantity weight of the $i^{th}$ type of VNFC and the actual quantity weight $\alpha_i$ that is of the $i^{th}$ type of VNFC and that is obtained by the calculation unit 3031, a $k^{th}$ type whose actual quantity weight is less than a preset quantity weight of the $k^{th}$ type to a maximum degree, where the $k^{th}$ type is one of the N types.

The selection unit 3033*a* is configured to select, as a new to-be-started virtual machine, an unstarted virtual machine including the $k^{th}$ type of VNFC determined by the determining unit 3032*a*, where an unstarted virtual machine including a maximum quantity of the $k^{th}$ type of VNFC may be selected; if multiple unstarted virtual machines include a maximum quantity of the $k^{th}$ type of VNFC, the selection unit 3033*a* may select, from the multiple unstarted virtual machines, an unstarted virtual machine including a maximum quantity of VNFC types of the N types, or select an unstarted virtual machine including a maximum total quantity of VNFCs in the first service; and VNFCs in the first service are various types of VNFCs in the N VNFC types.

The selection module 303 may further include a control unit 3034*a* configured to control the calculation unit 3031*a*, the determining unit 3032*a*, and the selection unit 3033*a* to successively and cyclically work in order, until the total quantity of the $i^{th}$ type of VNFC included in the first group of virtual machines meets the corresponding preset quantity.

In a process of controlling, by the control unit 3034, the calculation unit 3031*a*, the determining unit 3032*a*, and the selection unit 3033*a* to cyclically work in order, there is a selection order of the at least one to-be-started virtual machine selected by the selection unit 3033*a*. The selection module 303 may further include an order record unit 3036*a*, where the order record unit 3036*a* is configured to record the order of the at least one to-be-started virtual machine selected by the selection unit 3033*a*. The start module 304 correspondingly starts the at least one to-be-started virtual machine according to the order recorded by the order record unit 3036*a*.

In a specific implementation process, multiple implementation manners may be obtained through deriving because of different policies stored inside or invoked by the selection module 303. For example, in a process (not limited to the entire process, but including a part of the process) of selecting at least one to-be-started virtual machine, polling may be repeated for selecting currently unstarted virtual machines according to an order of maximum quantities of included VNFCs1, VNFCs2, VNFCs3, and VNFCs4, or polling may be performed for selecting currently unstarted virtual machines according to a descending order of total quantities of VNFCs included in the virtual machines, or polling may be performed for selecting currently unstarted virtual machines according to a descending order of quantities of VNFC types included in the virtual machines, until the $i^{th}$ type of VNFC included in the started virtual machine and the to-be-started virtual machines orchestrated for starting reaches the predetermined quantity. It should be noted that, in any one of the foregoing cases, when multiple virtual machines meet a same filtering condition, one of the multiple virtual machines may be selected in a random manner or according to an algorithm rule.

Example 2

A virtual machine start apparatus is provided, and the apparatus is applied to a NFV network that has M network service requirements (a multi-service scenario is described as above, and M network services continue to be used as an example in Example 2), M is a natural number greater than 1, and the apparatus 300 includes a determining module 301 configured to determine, according to an $x^{th}$ service, N(x) types of VNFCs corresponding to the $x^{th}$ service, where the $x^{th}$ service is one network service in the M network services, the N(x) types of VNFCs can jointly implement the $x^{th}$ service, N is a positive integer, and a value range of x includes all positive integers not greater than M; an obtaining module 302 configured to obtain a distribution relationship between the N(x) types of VNFCs determined by the determining module 301 and virtual machines, where the distribution relationship indicates a quantity of an $xi^{th}$ type of VNFC distributed in each virtual machine, each virtual machine includes a started virtual machine or an unstarted virtual machine, the $xi^{th}$ type is one of the N(x) types corresponding to the $x^{th}$ service, and a value range of i includes all positive integers not greater than N(x); a selection module 303 configured to select at least one to-be-started virtual machine from unstarted virtual machines according to a preset multi-service policy and the distribution relationship obtained by the obtaining module 302, so that a total quantity of the $xi^{th}$ type of VNFC included in a first group of virtual machines meets a corresponding preset quantity, where a set of the first group of virtual machines includes a started virtual machine and the at least one to-be-started virtual machine; and a start module 304 configured to start the at least one to-be-started virtual machine selected by the selection module 303.

In a specific implementation process, the obtaining module 302 obtains the distribution relationship between the N(x) types of VNFCs and virtual machines in multiple manners. For details, reference may be made to descriptions of the obtaining module 302 in Example 1, and the details are not described herein again.

In a possible design, if in a policy, a service has no absolute priority, for example, a service that has an absolute priority is not distinguished from a second service, a third service, and a fourth service, no attention is paid to whether expected performance standard of a service is bound to be preferentially met, and instead, a target is that each type of VNFC in each service reaches an estimated quantity. In this case, the selection module 303 may perform the method described in steps 2031a to 2033a, an instance corresponding to the method, and all implementation manners that may make an equivalent replacement. In a possible design, for an implementation manner of the selection module 303, reference may be made to FIG. 9. FIG. 9 is a schematic structural diagram of a selection module 303 in another virtual machine start apparatus according to an embodiment of the present disclosure. In this case, priorities of the M network services do not need to be distinguished. A specific implementation manner is as follows. The selection module 303 includes a calculation unit 3031a, a determining unit 3032a, and a selection unit 3033a.

The calculation unit 3031a is configured to determine an actual quantity weight $$\alpha_{xi} = \frac{Qxi}{\sum_{j=1}^{N(x)} Qxj}$$

of the $xi^{th}$ type of VNFC, where Qxi is a total quantity of the $xi^{th}$ type of VNFC in a second group of virtual machines, Qxj is a total quantity of an $xj^{th}$ type of VNFC in the second group of virtual machines, the $xj^{th}$ type is one of the N(x) types corresponding to the $x^{th}$ service, a value range of j includes all positive integers not greater than N(x), and the second group of virtual machines includes a currently started virtual machine and currently selected to-be-started virtual machines.

The determining unit 3032a is configured to find, according to a preset quantity weight of the $xi^{th}$ type of VNFC and the actual quantity weight $\alpha_{xi}$ that is of the $xi^{th}$ type of VNFC and that is calculated by the calculation unit 3031a, a $k^{th}$ type whose actual quantity weight is less than a preset quantity weight of the $k^{th}$ type to a maximum degree, where the $k^{th}$ type is one of the N(x) types.

The selection unit 3033a is configured to select, as a new to-be-started virtual machine, an unstarted virtual machine including the $k^{th}$ type of VNFC determined by the determining unit 3032a, where an unstarted virtual machine including a maximum quantity of the $k^{th}$ type of VNFC may be selected; if multiple unstarted virtual machines include a maximum quantity of the $k^{th}$ type of VNFC, the selection unit 3033a may select, from the multiple unstarted virtual machines, an unstarted virtual machine including a maximum quantity of VNFC types, or select an unstarted virtual machine including a maximum total quantity of VNFCs.

The selection module 303 may further include a control unit 3034a configured to control the calculation unit 3031a, the determining unit 3032a, and the selection unit 3033a to successively and cyclically work in order, until the total quantity of the $xi^{th}$ type of VNFC included in the first group of virtual machines meets the corresponding preset quantity.

In a process of controlling, by the control unit 3034a, the calculation unit 3031a, the determining unit 3032a, and the selection unit 3033a to successively and cyclically work in order, there is a selection order for to-be-started virtual machines selected by the selection unit 3033a. The apparatus further includes an order record unit 3036a configured to record the selection order for the to-be-started virtual machines selected by the selection unit 3033a. After obtaining the selection order recorded by the order record unit 3036a, the start module 304 starts, according to the selection order, the to-be-started virtual machines selected by the selection unit 3033a.

Figure 10:
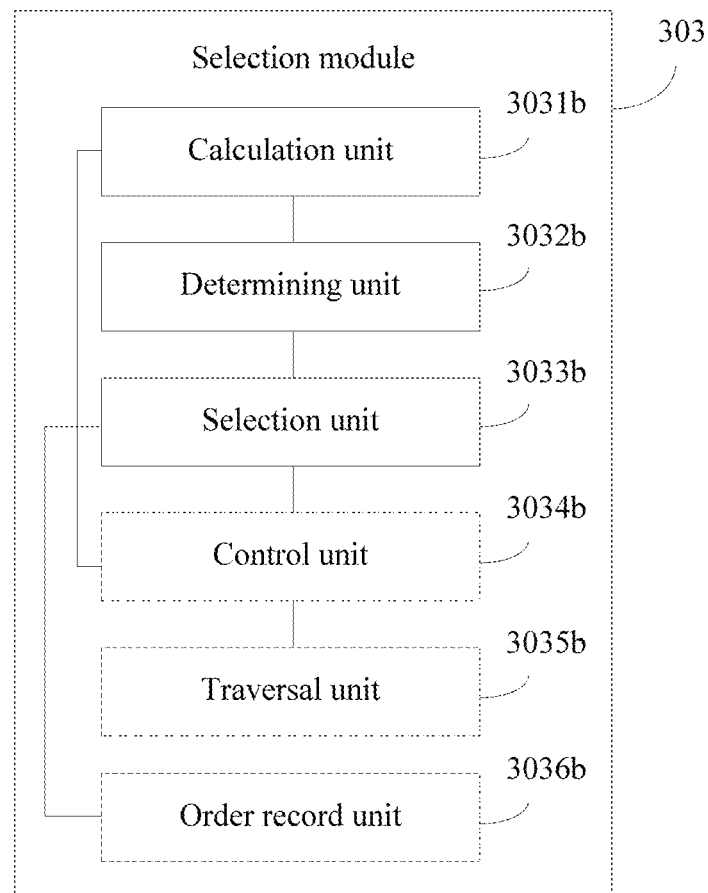
FIG. 10 is a schematic diagram of a selection module in another virtual machine start apparatus according to an embodiment of the present disclosure.

In another possible design, if in a start policy, a service has an absolute priority, for example, a priority of a second service is higher than a priority of a third service, and the priority of the third service is higher than a priority of a fourth service, an expected performance standard of the second service needs to be first reached. That is, after each type of VNFC corresponding to the second service reaches an expected quantity, the third service is considered using a same idea, and then the fourth service is considered. In this case, the selection module 303 may perform the method described in steps 2031b to 2033b, an instance corresponding to the method, and all implementation manners that may make an equivalent replacement. In a possible design, for an implementation manner of the selection module 303, reference may be made to FIG. 10. FIG. 10 is a schematic diagram of a selection module 303 in another virtual machine start apparatus according to an embodiment of the present disclosure. In this case, priorities of the M network services are differentiated. A specific implementation manner is as follows.

The selection module 303 includes a calculation unit 3031b, a determining unit 3032b, and a selection unit 3033b, and may further include a control unit 3034b and a traversal unit 3035b. Functions performed by the calculation unit 3031b, the determining unit 3032b, the selection unit 3033b, and the control unit 3034b in FIG. 10 are identical to those correspondingly performed by the calculation unit 3031a, the determining unit 3032a, the selection unit 3033a, and the control unit 3034a in FIG. 9, principles for transferring signals between the units are similar, a same working mode "calculation unit-determining unit-selection unit" is conformed for working, and the control units control the calculation units, the determining units, and the selection units to repeat a respective operation according to the working mode. A difference lies in that the embodiment shown in FIG. 10 further includes the traversal unit 3035b. The traversal unit 3035b is configured to determine a descending order of priorities of the M services, so that the control unit 3034b controls, for each service according to a service priority, the calculation unit 3031b, the determining unit 3032b, and the selection unit 3033b to successively and cyclically work according to the working mode of "calculation unit-determining unit-selection unit", until a quantity of each type of VNFC that is in the first group of virtual machines and that is in each service reaches a preset quantity.

In a process that the traversal unit 3035b enables the control unit 3034b to control, for each service, the calculation unit 3031b, the determining unit 3032b, and the selection unit 3033b to successively and cyclically work according to the working mode of "calculation unit-determining unit-selection unit", there is a selection order for to-be-started virtual machines selected by the selection unit 3033b. An order record unit 3036b is configured to record the selection order for the to-be-started virtual machines selected by the selection unit 3033b. After obtaining the selection order, the start module 304 starts the to-be-started virtual machines selected by the selection unit 3033b.

In a specific implementation process, multiple implementation manners may be obtained through deriving because of different policies stored inside or invoked by the selection module 303. For example, in a process (not limited to the entire process, but including a part of the process) of selecting at least one to-be-started virtual machine, polling may be repeated for selecting currently unstarted virtual machines according to an order of maximum quantities of included VNFCs1, VNFCs2, VNFCs3, and VNFCs4, or polling may be performed for selecting currently unstarted virtual machines according to a descending order of total quantities of VNFCs included in the virtual machines, or polling may be performed for selecting currently unstarted virtual machines according to a descending order of quantities of VNFC types included in the virtual machines, until the $xi^{th}$ type of VNFC included in the started virtual machine and the to-be-started virtual machines orchestrated for starting reaches the predetermined quantity. It should be noted that, in any one of the foregoing cases, when multiple virtual machines meet a same filtering condition, one of the multiple virtual machines may be selected in a random manner or according to an algorithm rule.

In this embodiment of the present disclosure, a virtual machine start apparatus includes a determining module, an obtaining module, a selection module, and a start module. The determining module is configured to determine N(x) VNFC types corresponding to an $x^{th}$ service. The selection module determines, according to a single/multi-service policy and a distribution relationship that is obtained by the obtaining module and that is between N(x) types of VNFCs and virtual machines, a to-be-started virtual machine from virtual machines that need to be started. The start module starts the to-be-started virtual machine. In the present disclosure, virtual machines on which VNFC types corresponding to a specified service run may be found and started as quickly as possible according to a VNFC required by the service, so that a problem, caused during limiting a starting quantity of virtual machines to avoid a virtual machine boot storm, that a service cannot be provided for a long time or a service processing capability cannot be improved for a long time can be resolved, the service is quickly provided, and the service processing capability is quickly improved. In addition, in the multiple implementation manners of the foregoing selection module, an unstarted virtual machine on which a most scarce type of VNFC is located can be selected according to a VNFC quantity status in a current virtual machine, so that utilization efficiency of a VNFC that runs on the current virtual machine and that is in a current service can be fully implemented in each period of time, and system performance is improved.

Figure 11:
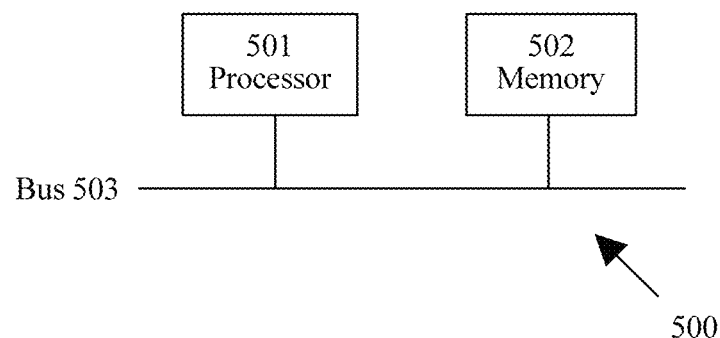
FIG. 11 is a computer schematic structural diagram of a virtual machine start device according to an embodiment of the present disclosure.

Referring to FIG. 11, FIG. 11 is a schematic structural diagram of a virtual machine start computer according to an embodiment of the present disclosure. The device 500 includes a processor 501, a memory 502, and a bus 503.

The processor 501 is configured to generate a corresponding operation control signal, send the operation control signal to a corresponding part of a computing processing device, and read and process data in software, especially read and process data and a program in the memory 502, so that all function modules in the computing processing device perform corresponding functions, so as to control a corresponding part to perform an action according to an instruction requirement.

The memory 502 is configured to store the program and various data, and mainly store software units such as an operating system, an application, and a function instruction, or a subset thereof, or an extension set thereof. The operating system includes various system programs, for example, a windows series, which are used to implement various basic services and process a hardware-based task. The memory 502 may further include a non-volatile random access memory (NVRAM) and provide the processor 501 with software and the application for managing hardware, software, and data resources in the computing processing device and supporting control.

All the foregoing hardware units may be connected for communication using the bus 503.

In this way, the processor 501 determines N types of virtualized network function components VNFCs according to a first service by invoking the program or an instruction stored in the memory 502; obtains a distribution relationship between the N types of VNFCs and virtual machines, where the distribution relationship indicates a quantity of an $i^{th}$ type of VNFC distributed in each virtual machine, the $i^{th}$ type is one of the N types, and a value range of i includes all positive integers not greater than N; selects at least one to-be-started virtual machine from unstarted virtual machines according to the distribution relationship and a preset service policy in the memory 502, so that a total quantity of the $i^{th}$ type of VNFC included in a first group of virtual machines meets a corresponding preset quantity, where a set of the first group of virtual machines includes a started virtual machine and the at least one to-be-started virtual machine; and starts the at least one to-be-started virtual machine.

Similarly, the processor 501 may perform, by invoking the program or the instruction stored in the memory 502, the methods described in steps 101 to 104 and steps 201 to 204 and related instances.

In addition, in a specific implementation process, the processor 501 may perform, by invoking the program or the instruction stored in the memory 502, possible implementation methods in all scenarios in the foregoing method embodiments, instances corresponding to the methods, and all methods that may make an equivalent replacement.

A person of ordinary skill in the art may understand that all or some of the steps of the foregoing methods may be implemented by a program instructing relevant hardware. The program may be stored in a computer readable storage medium. With descriptions of the foregoing embodiments, a person skilled in the art may clearly understand that the present disclosure may be implemented by hardware, firmware or a combination thereof.

What is described above is merely some embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure. That is, any modification, equivalent replacement, or improvement meets that a corresponding virtual machine is started according to a service shall fall within the protection scope of the present disclosure.

What is claimed is:

1. A virtual machine start method applied to a network function virtualization (NFV) network on which a first network service is deployed, wherein the NFV network is implemented by multiple virtual machines running on a computing device, wherein the first network service is jointly implemented by N types of virtualized network function components (VNFCs), wherein N is a positive integer, and wherein the method comprises:

obtaining a distribution relationship between the N types of VNFCs and the multiple virtual machines, wherein the distribution relationship indicates a quantity of each of the N types of VNFCs in each of the multiple virtual machines;

selecting at least one unstarted virtual machine from the multiple virtual machines as a to-be-started virtual machine set according to the distribution relationship, wherein a total quantity of each type of VNFC in a first group of virtual machines meets a preset quantity corresponding to each type of VNFC, wherein a set of the first group of virtual machines comprises a started virtual machine set and the to-be-started virtual machine set, wherein a quantity of started virtual machines in the started virtual machine set is greater than or equal to 0, wherein the started virtual machine belongs to the multiple virtual machines, and wherein the at least one unstarted virtual machine is selected from the multiple virtual machines as the to-be-started virtual machine set according to the distribution relationship by:

determining a current quantity weight of each type of VNFC in the first group of virtual machines according to $$\alpha_i = \frac{Qi}{\sum_{j=1}^{N} Qj},$$

wherein $\alpha_i$ is a current quantity weight of an $i^{th}$ type of VNFC, wherein Qi is a current total quantity of the $i^{th}$ type of VNFC in the first group of virtual machines, wherein Qj is a current total quantity of a $j^{th}$ type of VNFC in the first group of virtual machines, wherein the $i^{th}$ type of VNFC and the $j^{th}$ type of VNFC belong to the N types of VNFCs, and wherein value ranges of i and j comprise positive integers not greater than N;

finding, according to the determined current quantity weight of each type of VNFC and a preset quantity weight of each type of VNFC, a $k^{th}$ type of VNFC whose current quantity weight is less than a preset quantity weight to a maximum degree, wherein the $k^{th}$ type of VNFC is one of the N types of VNFCs;

selecting, from the multiple virtual machines, an unstarted virtual machine comprising the $k^{th}$ type of VNFC to be added to the to-be-started virtual machine set; and repeating the determining, the finding, and the selecting in order, until the total quantity of each type of VNFC in the N types and in the first group of virtual machines meets the preset quantity corresponding to each type of VNFC; and starting a virtual machine in the to-be-started virtual machine set.

2. The method according to claim 1, wherein selecting, from the multiple virtual machines, the unstarted virtual machine comprising the $k^{th}$ type of VNFC to be added to the to-be-started virtual machine set comprises any one of:

selecting an unstarted virtual machine comprising a maximum quantity of the $k^{th}$ type of VNFC to be added to the to-be-started virtual machine set; or selecting an unstarted virtual machine comprising a maximum quantity of VNFC types of the N types to be added to the to-be-started virtual machine set in response to multiple unstarted virtual machines comprising a maximum quantity of the $k^{th}$ type of VNFC; or selecting an unstarted virtual machine comprising a maximum total quantity of VNFCs used to implement the first network service to be added to the to-be-started virtual machine set.

3. The method according to claim 1, further comprising obtaining a selection order of the at least one unstarted virtual machine in a process of repeating the determining, the finding, and the selecting in order, wherein starting a virtual machine in the to-be-started virtual machine set comprises starting the at least one unstarted virtual machine according to the selection order.

4. A virtual machine start method applied to a network function virtualization (NFV) network on which M network services are deployed, wherein the NFV network is implemented by multiple virtual machines running on a computing device, wherein an $x^{th}$ service is one network service in the M network services, wherein the $x^{th}$ service is jointly implemented by N(x) types of virtualized network function components (VNFCs), wherein N is a positive integer, wherein a value range of x comprises all positive integers not greater than M, wherein M is a natural number greater than 1, and wherein the method comprises:

obtaining a distribution relationship between the N(x) types of VNFCs and the multiple virtual machines, wherein the distribution relationship indicates a quantity of an $xi^{th}$ type of VNFC distributed in each of the multiple virtual machines, wherein the $xi^{th}$ type is one of the N(x) types corresponding to the $x^{th}$ service, and wherein a value range of xi comprises all positive integers not greater than N(x);

selecting at least one unstarted virtual machine from the multiple virtual machines as a to-be-started virtual machine set according to the distribution relationship, wherein a total quantity of each type of VNFC in a first group of virtual machines and in the M network services meets a preset quantity corresponding to each type of VNFC, wherein a set of the first group of virtual machines comprises a started virtual machine set and the to-be-started virtual machine set, wherein a quantity of started virtual machines in the started virtual machine set is greater than or equal to 0, wherein the started virtual machine belongs to the multiple virtual machines, and wherein the at least one unstarted virtual machine is selected from the multiple virtual machines as a to-be-started virtual machine set according to the distribution relationship by:

determining a current quantity weight of the $xi^{th}$ type of VNFC in the first group of virtual machines according to $$\alpha_{xi} = \frac{Qxi}{\sum_{j=s}^{N} Qxj},$$

wherein $\alpha_{xi}$ is the current quantity weight of the $xi^{th}$ type of VNFC, Qxi is a current total quantity of the $xi^{th}$ type of VNFC in the first group of virtual machines, Qxj is a current total quantity of an $xj^{th}$ type of VNFC in the first group of virtual machines, the $xj^{th}$ type is one of the N(x) types corresponding to the $x^{th}$ service, and a value range of xj comprises all positive integers not greater than N(x);

finding, according to the determined current quantity weight $\alpha_{xi}$ of the $xi^{th}$ type of VNFC and a preset quantity weight of the $xi^{th}$ type of VNFC, a $k^{th}$ type of VNFC whose current quantity weight is less than a preset quantity weight to a maximum degree, wherein the $k^{th}$ type of VNFC is one of the N(x) types of VNFCs;

selecting, from the multiple virtual machines, an unstarted virtual machine comprising the $k^{th}$ type of VNFC to be added to the to-be-started virtual machine set; and repeating the determining, the finding, and the selecting in order, until the total quantity of each type of VNFC comprised in the first group of virtual machines and in the M network services meets the preset quantity corresponding to each type of VNFC; and starting a virtual machine in the to-be-started virtual machine set.

5. The method according to claim 4, wherein selecting, from the multiple virtual machines, the unstarted virtual machine comprising the $k^{th}$ type of VNFC to be added to the to-be-started virtual machine set comprises any one of:

selecting an unstarted virtual machine comprising a maximum quantity of the $k^{th}$ type of VNFC to be added to the to-be-started virtual machine set; or selecting, when multiple unstarted virtual machines comprise a maximum quantity of the $k^{th}$ type of VNFC, an unstarted virtual machine comprising a maximum quantity of VNFC types to be added to the to-be-started virtual machine set, or selecting an unstarted virtual machine comprising a maximum quantity of VNFCs to be added to the to-be-started virtual machine set.

6. The method according to claim 4, further comprising obtaining a selection order of the at least one selected unstarted virtual machine in a process of repeating the determining, the finding, and the selecting, wherein starting the virtual machine in the to-be-started virtual machine set comprises starting the at least one selected unstarted virtual machine according to the selection order.

7. A virtual machine start method applied to a network function virtualization (NFV) network on which M network services are deployed, wherein the NFV network is implemented by multiple virtual machines running on a computing device, wherein an $x^{th}$ service is one network service in the M network services, wherein the $x^{th}$ service is jointly implemented by N(x) types of virtualized network function components (VNFCs), wherein N is a positive integer, wherein a value range of x comprises all positive integers not greater than M, wherein M is a natural number greater than 1, and wherein the method comprises:

obtaining a distribution relationship between the N(x) types of VNFCs and the multiple virtual machines, wherein the distribution relationship indicates a quantity of an $xi^{th}$ type of VNFC distributed in each of the multiple virtual machines, wherein the $xi^{th}$ type is one of the N(x) types corresponding to the $x^{th}$ service, and wherein a value range of xi comprises all positive integers not greater than N(x);

selecting at least one unstarted virtual machine from the multiple virtual machines as a to-be-started virtual machine set according to the distribution relationship, wherein a total quantity of each type of VNFC in a first group of virtual machines and in the M network services meets a preset quantity corresponding to each type of VNFC, wherein a set of the first group of virtual machines comprises a started virtual machine set and the to-be-started virtual machine set, wherein a quantity of started virtual machines in the started virtual machine set is greater than or equal to 0, wherein the started virtual machine belongs to the multiple virtual, and wherein the at least one unstarted virtual machine is selected from the multiple virtual machines as a to-be-started virtual machine set according to the distribution relationship by:

determining a descending order of priorities of the M services; and successively performing a service enabling operation on all services in the M services according to the descending order of priorities, wherein the service enabling operation comprises:

determining a current quantity weight of each type of VNFC in the first group of virtual machines according to $$\alpha_{xi} = \frac{Qxi}{\sum_{xj=1}^{N} Qxj},$$

wherein $\alpha_{xi}$ is a current quantity weight of the $xi^{th}$ type of VNFC, wherein Qxi is a current total quantity of the $xi^{th}$ type of VNFC in the first group of virtual machines, wherein Qxj is a current total quantity of the $xj^{th}$ type of VNFC in the first group of virtual machines, and wherein a value range of xj comprises all positive integers not greater than N(x) corresponding to a current service;

finding, according to the determined current quantity weight $\alpha_{xi}$ of each type of VNFC in the current service and a preset quantity weight of each type of VNFC in the current service, a $k^{th}$ type of VNFC whose current quantity weight is less than a preset quantity weight to a maximum degree, wherein the $k^{th}$ type is one of the N(x) types in the current service;

selecting, from the multiple virtual machines, an unstarted virtual machine comprising the $k^{th}$ type of VNFC to be added to the to-be-started virtual machine set; and repeating the determining, the finding, and the selecting in order, until a total quantity of each type of VNFC in the first group of virtual machines and in the current service meets a preset quantity corresponding to each type of VNFC in the current service; and starting a virtual machine in the to-be-started virtual machine set.

8. The method according to claim 7, further comprising obtaining a selection order of the at least one selected unstarted virtual machine in a process of successively performing a service enabling operation on all services in the M services according to the descending order of priorities, wherein starting the virtual machine in the to-be-started virtual machine set comprises starting the at least one selected unstarted virtual machine according to the selection order.

9. A virtual machine start device, comprising:
a memory storing a program and an instruction; and
a processor coupled to the memory via a bus, wherein the processor invokes the program and the instruction in the memory and is applied to a network function virtualization (NFV) network on which M network services are deployed, and wherein the NFV network is implemented by multiple virtual machines running on a computing device,
wherein an $x^{th}$ service is one network service in the M network services, wherein the $x^{th}$ service is jointly implemented by N(x) types of virtualized network function components (VNFCs), wherein N is a positive integer, wherein a value range of x comprises all positive integers not greater than M, wherein M is a natural number greater than 1, and wherein the processor is configured to:

obtain a distribution relationship between the N(x) types of VNFCs and the multiple virtual machines, wherein the distribution relationship indicates a quantity of an $xi^{th}$ type of VNFC distributed in each of the multiple virtual machines, wherein the $xi^{th}$ type is one of the N(x) types corresponding to the $x^{th}$ service, and wherein a value range of xi comprises all positive integers not greater than N(x);

select at least one unstarted virtual machine from the multiple virtual machines as a to-be-started virtual machine set according to the distribution relationship, wherein a total quantity of each type of VNFC in a first group of virtual machines and in the M network services meets a preset quantity corresponding to each type of VNFC, wherein a set of the first group of virtual machines comprises a started virtual machine set and the to-be-started virtual machine set, wherein a quantity of started virtual machines in the started virtual machine set is greater than or equal to 0, wherein the started virtual machine belongs to the multiple virtual machines, and wherein the at least one unstarted virtual machine is selected from the multiple virtual machines as a to-be-started virtual machine set according to the distribution relationship by:

determining a current quantity weight of the $xi^{th}$ type of VNFC in the first group of virtual machines according to $$\alpha_{xi} = \frac{Qxi}{\sum_{j=1}^{N} Qxj},$$

wherein $\alpha_{xi}$ is the current quantity weight of the $xi^{th}$ type of VNFC, Qxi is a current total quantity of the $xi^{th}$ type of VNFC in the first group of virtual machines, Qxj is a current total quantity of an $xj^{th}$ type of VNFC in the first group of virtual machines, the $xj^{th}$ type is one of the N(x) types corresponding to the $x^{th}$ service, and a value range of xj comprises all positive integers not greater than N(x);

finding, according to the determined current quantity weight $\alpha_{xi}$ of the $xi^{th}$ type of VNFC and a preset quantity weight of the $xi^{th}$ type of VNFC, a $k^{th}$ type of VNFC whose current quantity weight is less than a preset quantity weight to a maximum degree, wherein the $k^{th}$ type of VNFC is one of the N(x) types of VNFCs;

selecting, from the multiple virtual machines, an unstarted virtual machine comprising the $k^{th}$ type of VNFC to be added to the to-be-started virtual machine set; and repeating the determining, the finding, and the selecting in order, until the total quantity of each type of VNFC comprised in the first group of virtual machines and in the M network services meets the preset quantity corresponding to each type of VNFC; and start a virtual machine in the to-be-started virtual machine set.

10. A virtual machine start device, comprising:
a memory storing a program and an instruction; and
a processor coupled to the memory via a bus, wherein the processor invokes the program and the instruction in the memory and is applied to a network function virtualization (NFV) network on which M network services are deployed, wherein the NFV network is implemented by multiple virtual machines running on a computing device, wherein an $x^{th}$ service is one network service in the M network services, wherein the $x^{th}$ service is jointly implemented by N(x) types of virtualized network function components (VNFCs), wherein N is a positive integer, wherein a value range of x comprises all positive integers not greater than M, wherein M is a natural number greater than 1, and wherein the processor is configured to:

obtain a distribution relationship between the N(x) types of VNFCs and the multiple virtual machines, wherein the distribution relationship indicates a quantity of an $xi^{th}$ type of VNFC distributed in each of the multiple virtual machines, wherein the $xi^{th}$ type is one of the N(x) types corresponding to the $x^{th}$ service, and wherein a value range of xi comprises all positive integers not greater than N(x);

select at least one unstarted virtual machine from the multiple virtual machines as a to-be-started virtual machine set according to the distribution relationship, wherein a total quantity of each type of VNFC in a first group of virtual machines and in the M network services meets a preset quantity corresponding to each type of VNFC, wherein a set of the first group of virtual machines comprises a started virtual machine set and the to-be-started virtual machine set, wherein a quantity of started virtual machines in the started virtual machine set is greater than or equal to 0, wherein the started virtual machine belongs to the multiple virtual machines, and wherein the at least one unstarted virtual machine is selected from the multiple virtual machines as a to-be-started virtual machine set according to the distribution relationship by:

determining a descending order of priorities of the M services, and successively performing a service enabling operation on all services in the M services according to the descending order of priorities, wherein the service enabling operation comprises:

determining a current quantity weight of each type of VNFC in the first group of virtual machines according to $$\alpha_{xi} = \frac{Qxi}{\sum_{xj=1}^{N} Qxj},$$

wherein $\alpha_{xi}$ is a current quantity weight of the $xi^{th}$ type of VNFC, wherein Qxi is a current total quantity of the $xi^{th}$ type of VNFC in the first group of virtual machines, wherein Qxj is a current total quantity of the $xj^{th}$ type of VNFC in the first group of virtual machines, and wherein a value range of xj comprises all positive integers not greater than N(x) corresponding to a current service;

finding, according to the determined current quantity weight $\alpha_{xi}$ of each type of VNFC in the current service and a preset quantity weight of each type of VNFC in the current service, a $k^{th}$ type of VNFC whose current quantity weight is less than a preset quantity weight to a maximum degree, wherein the $k^{th}$ type is one of the N(x) types in the current service;

selecting, from the multiple virtual machines, an unstarted virtual machine comprising the $k^{th}$ type of VNFC to be added to the to-be-started virtual machine set; and repeating the determining, the finding, and the selecting in order, until a total quantity of each type of VNFC in the first group of virtual machines and in the current service meets a preset quantity corresponding to each type of VNFC in the current service; and start a virtual machine in the to-be-started virtual machine set.

* * * * *